(12) United States Patent
Miyajima et al.

(10) Patent No.: US 7,801,059 B2
(45) Date of Patent: Sep. 21, 2010

(54) IP COMMUNICATION APPARATUS AND NAT TYPE DETERMINATION METHOD BY THE SAME

(75) Inventors: Akira Miyajima, Kanagawa (JP);
Munetaka Washizu, Osaka (JP);
Hirokazu Hayata, Fukuoka (JP);
Takeshi Suga, Kanagawa (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 12/104,783

(22) Filed: Apr. 17, 2008

(65) Prior Publication Data

US 2008/0259943 A1  Oct. 23, 2008

(30) Foreign Application Priority Data

Apr. 20, 2007  (JP) ............................ 2007-111827
Jun. 28, 2007  (JP) ............................ 2007-171133

(51) Int. Cl.
*H04L 12/56* (2006.01)

(52) U.S. Cl. ..................... 370/254; 370/389; 370/401

(58) Field of Classification Search ................ None
See application file for complete search history.

(56) References Cited

U.S. PATENT DOCUMENTS

2005/0105543 A1*  5/2005  Ikenaga et al. ............... 370/428

FOREIGN PATENT DOCUMENTS

JP      2005-151142      6/2005

OTHER PUBLICATIONS

Rosenberg et al., "RFC 3489: STUN-Simple Traversal of User Datagram Protocol (UDP) Through Network Address Translators (NATs)", Mar. 2003.*
English language Abstract of JP 2005-151142.

* cited by examiner

*Primary Examiner*—Chirag G Shah
*Assistant Examiner*—Salvador E Rivas
(74) *Attorney, Agent, or Firm*—Greenblum & Bernstein P.L.C.

(57) ABSTRACT

In a NAT type determination method pursuant to RFC 3489, address information added in a binding response from a STUN server in response to a binding request issued in a latest transmission test is compared with address information added in a binding response in response to any transmission test executed therebefore. When the address information are not identical, a NAT type is determined symmetric. Even when a router whose NAT type changes frequently according to a use status is connected, communication is capable without manual setting change by a user.

9 Claims, 20 Drawing Sheets

Fig.12

| Test No. | LAN-side port number | Destination IP number | Destination port number | WAN-side port number |
|---|---|---|---|---|
| 1-1 | 10000 | 192.168.0.200 | 17000 | 10000 |
| 1-2 | 10000 | 192.168.0.200 | ※15000 | 10000 |
| 1-3 | 10000 | ※192.168.0.3 | 15000 | 33576 |
| 2-1 | 20000 | 192.168.0.200 | 17000 | 20000 |
| 2-2 | 20000 | ※192.168.0.3 | ※15000 | 20000 |
| 2-3 | 20000 | ※192.168.0.200 | 15000 | 33602 |
| 3-1 | 30000 | 192.168.0.200 | 15000 | 30000 |
| 3-2 | 30000 | 192.168.0.200 | ※17000 | 30000 |
| 3-3 | 30000 | ※192.168.0.3 | ※15000 | 33779 |
| 4-1 | 40000 | 192.168.0.200 | 15000 | 40000 |
| 4-2 | 40000 | ※192.168.0.3 | 15000 | 40000 |
| 4-3 | 40000 | ※192.168.0.200 | ※17000 | 33174 |
| 5-1 | 50000 | 192.168.0.3 | 15000 | 50000 |
| 5-2 | 50000 | ※192.168.0.200 | ※17000 | 50000 |
| 5-3 | 50000 | 192.168.0.200 | ※15000 | 33328 |
| 6-1 | 60000 | 192.168.0.3 | 15000 | 60000 |
| 6-2 | 60000 | ※192.168.0.200 | 15000 | 60000 |
| 6-3 | 60000 | 192.168.0.200 | ※17000 | 33122 |

Fig.13

| Test No. | LAN-side port number | Destination IP number | Destination port number | WAN-side port number |
|---:|---:|---:|---:|---:|
| 7-1 | 10000 | 192.168.0.200 | 17000 | 10000 |
| 7-2 | 10000 | 192.168.0.200 | ※15000 | 10000 |
| 7-3 | 10000 | 192.168.0.200 | 17000 | 10000 |
| 7-4 | 10000 | ※192.168.0.3 | ※15000 | 33576 |
| 8-1 | 20000 | 192.168.0.200 | 15000 | 20000 |
| 8-2 | 20000 | 192.168.0.200 | ※16000 | 20000 |
| 8-3 | 20000 | 192.168.0.200 | ※17000 | 33018 |

NAT type

IP COMMUNICATION APPARATUS AND NAT TYPE DETERMINATION METHOD BY THE SAME

CROSS-REFERENCE TO RELATED APPLICATIONS

The present application claims priority under 35 U.S.C. §119 of Japanese Applications No. 2007-111827 filed on Apr. 20, 2007, and No. 2007-171133 filed on Jun. 28, 2007, the disclosure of which is expressly incorporated by reference herein in its entirety.

BACKGROUND OF THE INVENTION

1. Field of the Invention

The present invention relates to an IP (Internet Protocol) communication apparatus and a NAT (Network Address Translation) type determination method performed by the IP communication apparatus, the IP communication apparatus being connected to a wide-area network via a relay apparatus that has a NAT function.

2. Description of Related Art

Conventionally, an IP communication apparatus (IP telephone apparatus and the like) connected to a LAN (Local Area Network) at office or home is generally connected to a WAN (Wide-Area Network) via a predetermined relay apparatus (router and the like). As such a relay apparatus, there is a relay apparatus installed with a NAT function for transparently performing conversion between a private IP address, which is valid only on a LAN, and a global IP address, which allows access to an external WAN. Such a relay apparatus has advantages, including increased flexibility in providing IP addresses to apparatuses connected to the LAN and improved security on the LAN.

However, to access an IP telephone service using such an IP communication apparatus connected to the WAN via the relay apparatus having the NAT function, for example, SIP (Session Initiation Protocol) or the like, which is used as a call control protocol, adds a private IP address and port number to a data potion of an IP packet for communication. Thus, the NAT function, which converts only an IP address in a header portion of an IP packet, cannot convert the IP address in the data portion. In addition, even when attempting to add a global IP address to the data portion of the IP packet, the IP communication apparatus has a problem where the apparatus cannot recognize the global address and port number information that the apparatus uses. As a result, a commonly-called NAT traversal problem has arisen, where the relay apparatus blocks delivery of a communication packet from the WAN side to the LAN side.

To address such problems, methods are known that use STUN (Simple Traversal of User Datagram Protocol). For instance, installing a STUN server for providing information on the global network allows the IP communication apparatus to obtain information required for NAT traversal (global IP address, port number, NAT type, and the like).

Conventional technology to achieve NAT traversal using the STUN protocol is known in an information communication system, for example, where a plurality of terminal apparatuses are respectively connected to different routers and perform P2P (Peer to Peer) communication over the Internet. When the connected router has a UPnP function, the terminal apparatus obtains a global IP address and port number based on a UPnP protocol, and registers the obtained information in an information controller on the Internet as exchange information. When the connected router has no UPnP function, on the other hand, the terminal apparatus obtains a global IP address and port number based on the STUN protocol, and registers the obtained information in the information controller as exchange information. For communication between the terminal apparatuses, the apparatuses mutually obtain the exchange information of the apparatuses to communicate with, so as to achieve NAT traversal communication using the obtained exchange information (see Related Art 1).

[Related Art 1] Japanese Patent Laid-open Publication No. 2005-151142

The algorithm defined by RFC (Request For Comment) 3489 issued by the IETF (Internet Engineering Task Force) categorizes NAT into the following four types: full cone, restricted cone, port restricted cone, and symmetric.

FIG. 10 illustrates an example of a flow for determining a NAT type according to the algorithm defined by RFC 3489; and FIGS. 11A to 11D illustrate an overview of transmission tests executed for the determination.

As shown in FIG. 10, a terminal apparatus that determines a NAT type first executes a transmission test (I) (ST 101). In the transmission test (I), as shown in FIG. 11A, the terminal apparatus transmits a binding request to a first destination of a STUN server, which is IP address A and port number p (a similar combination of IP address and port number is hereinafter referred to, such as "Address (A, p)"), via a router that has a NAT function. In this case, a CHANGE-REQUEST (source information change request) attribute, which requests change of a source IP address and port number in a binding response, is not specified for the STUN server. Subsequently, the terminal apparatus determines whether or not there is a response from the STUN server (ST 102). When there is no response, the terminal apparatus determines: "(1) A firewall exists that blocks UDP." On the other hand, when receiving a binding response from the STUN server (ST 102: Yes), the terminal apparatus determines whether or not an IP address added as a MAPPED-ADDRESS (mapping address) attribute thereof (i.e., a source IP address in the binding request received by the STUN server) is identical to a private IP address of the terminal apparatus (ST 103).

When the IP addresses are identical, the terminal apparatus determines that the terminal apparatus is not under control of NAT, and further executes a transmission test (II) (ST 104). In the transmission test (II), as shown in FIG. 11B, the terminal apparatus transmits a binding request to the same destination as in the transmission test (I) (Address (A, p)). In the CHANGE-REQUEST attribute, however, the terminal apparatus sets an IP address and port number different from the destination of the binding request (Address (B, q)), as a source address when the STUN server responses. Then, the terminal apparatus determines whether or not there is a response from the STUN server (ST 105). When there is no response, the terminal apparatus determines: "(2) An address is not converted, but a firewall exists that blocks UDP, such as symmetric NAT." On the other hand, when receiving a binding response from the STUN server (ST 105: Yes), the terminal apparatus determines: "(3) Open Internet that has no access limit."

Meanwhile, when the IP addresses are not identical in ST 103 (i.e., the terminal apparatus is under control of NAT), the terminal apparatus executes the transmission test (II) similar to ST 104 (ST 106), and determines whether or not there is a response from the STUN server (ST 107). When there is a response, which is from the IP address and port number different from the destination of the binding request (Address (B, q)) as instructed, the terminal apparatus determines that the router's NAT type is "(4) Full cone." On the other hand, when there is no response (ST 107: No), the terminal apparatus subsequently executes a transmission test (I') (ST 108). In the transmission test (I'), as shown in FIG. 11D, the terminal apparatus transmits a binding request to a second destination of the STUN server, which is Address (B, q), via the router. Similar to the transmission test (I), the CHANGE-REQUEST attribute is not specified in this case.

Thereafter, when receiving a binding response from the STUN server to the binding request in the transmission test (I'), the terminal apparatus determines whether or not an IP address and port number added as the MAPPED-ADDRESS attribute thereof (i.e., a source IP address and port number in the binding request received by the STUN server) are identical to the IP address and port number added as the MAPPED-ADDRESS attribute in the preceding transmission test (I) (ST 109). When the IP address and port number are not identical, which indicates that the port number of the source router is changed when the binding request is transmitted to the different IP address of the STUN server, the terminal apparatus determines that the NAT type is "(5) Symmetric NAT."

Meanwhile, when the IP addresses are identical in ST 109, the terminal apparatus subsequently executes a transmission test (III) (ST 110), and determines whether or not there is a response from the STUN server (ST 111). In the transmission test (III), as shown in FIG. 11C, the terminal apparatus transmits a binding request to the same destination as in the transmission test (I) (Address (A, p)). In the CHANGE-REQUEST attribute, however, the terminal apparatus sets a port number different from the destination of the binding request (Address (A, q)), as the source address when the STUN server responses. When there is no response, which indicates that no response is returned from the same IP address and different port number, the terminal apparatus determines that the router's NAT type is "(6) Port restricted cone." On the other hand, when there is a response, which indicates that a response is returned as far as the IP address is identical, even though the port number is different, the terminal apparatus determines that the NAT type is "(7) Restricted cone." As described above, the terminal apparatus under control of NAT is capable of determining the NAT type by appropriately executing the transmission tests (I) to (III) and (I').

According to research by the inventors of the present invention, however, it is confirmed that some routers behave in a manner that may cause an erroneous determination when the above-described NAT type determination flow pursuant to RFC 3489 is employed. In the research, test packets were transmitted from a same LAN-side port number of a terminal apparatus to different addresses (a plurality of IP addresses and port numbers) through a router to be examined, and changes of WAN-side port numbers of the router were detected. FIGS. 12 and 13 illustrate a portion of results of the research conducted by the present inventors.

In FIG. 12, Test 1 (1-1 to 1-3) shows that when the LAN-side port number was set to 10000 and a test packet was first transmitted to a first destination (destination IP address: 192.168.0.200; destination port number: 17000), the WAN-side port number was set to 10000 (1-1); that when a test packet was then transmitted to a second destination (destination IP address: 192.168.0.200; destination port number: 15000), in which the port number was changed from the first destination, the WAN-side port number was similarly set to 10000 (1-2); and that when a test packet was further transmitted to a third destination (destination IP address: 192.168.0.3; destination port number: 15000), in which the IP address was changed from the second destination, the WAN-side port number was changed and set to 33576 (1-3).

Test 2 (2-1 to 2-3) shows that when the LAN-side port number was set to 20000 and a test packet was first transmitted to a first destination (destination IP address: 192.168.0.200; destination port number: 17000), the WAN-side port number was set to 20000 (2-1); that when a test packet was then transmitted to a second destination (destination IP address: 192.168.0.3; destination port number: 15000), in which the IP address and port number were changed from the first destination, the WAN-side port number was similarly set to 20000 (2-2); and that when a test packet was further transmitted to a third destination (destination IP address: 192.168.0.200; destination port number: 15000), in which the IP address was changed from the second destination, the WAN-side port number was changed and set to 33602 (2-3).

Remaining Tests 3 to 6 also show results of three test packet transmissions, in which at least the destination IP address or port number was similarly changed (changed IP addresses and port numbers are indicated with "*"). The research results on the examined router demonstrated that when the test packets were transmitted from the same LAN-side port while the destinations were changed (at least the IP address or port number was different from the immediately preceding packet), the WAN-side port number was changed when the third test packet was transmitted. FIG. 13 illustrates the research results further in detail.

In FIG. 13, Test 7 (7-1 to 7-4) shows that even when a test packet was transmitted to a first destination same as a packet transmission 7-1 (destination IP address: 192.168.0.200; destination port number: 17000), after packet transmissions 7-1 and 7-2 were executed similar to 1-1 and 1-2 in the above-described test, the WAN-side port number was similarly set to 10000 (7-3). When a test packet was further transmitted to a third destination (destination IP address: 192.168.0.3; destination port number: 15000), in which the IP address and port number were changed from the first destination, the WAN-side port number was changed and set to 33576 (7-4).

Further, Test 8 (8-1 to 8-3) shows that when the LAN-side port number was set to 20000 and a test packet was first transmitted to a first destination (destination IP address: 192.168.0.200; destination port number: 15000), the WAN-side port number was set to 20000 (8-1); that when a test packet was then transmitted to a second destination (destination IP address: 192.168.0.200; destination port number: 16000), in which the port number was changed from the first destination, the WAN-side port number is similarly set to 20000 (8-2); and when that a test packet was further transmitted to a third destination (destination IP address: 192.168.0.200; destination port number: 17000), in which the port number was set differently from the first and second destinations, the WAN-side port number was changed and set to 33018 (8-3).

The investigation results on the investigated router demonstrated that when the test packets were transmitted from the same LAN-side port to the three different destinations (at least the IP address or port number was different from the destination to which the packet had already been transmitted), the WAN-side port number was changed (i.e., the router's NAT type was subsequently symmetric).

When the NAT type determination as shown in FIG. 10 is executed using the investigated router above, only the destination in the transmission test (I') among the transmission tests (I) to (III) and (I') is different from others (i.e., packet transmissions are executed to two different destinations). Thus, despite the fact that the router functions as symmetric NAT subsequently, the terminal apparatus makes a wrong determination in ST 111 that the NAT type is "(6) Port restricted cone."

Thus, when a communication is performed via NAT based on information obtained by STUN, it is generally required to confirm the NAT type in advance. When such a router as checked above is used, however, the terminal apparatus wrongly determines symmetric (subsequent) as restricted cone, and thus may not be able to properly execute a NAT traversal process. When the router in the research above is used in the conventional technology described in Related Art 1, the terminal apparatus is unable to accurately anticipate a NAT port number, and thus is difficult to properly execute the NAT traversal process.

In addition, the research by the present inventors indicate that there is a case where a certain type router changes a port number assignment rule depending on an operation environment, and thus, when the above-described NAT type determination process is routinely performed, a different NAT type is detected from a certain point onwards. One of the operations associated with the change in port number assignment rule according to the operation environment is called "port reuse." A certain proportion of currently existing routers performs the operation.

FIGS. 14A and 14B illustrate examples of the operation environment where the port reuse operation occurs. NAT routers shown in FIGS. 14A and 14B have the port reuse property, which performs NAT setting using a port number same as a source port number of a terminal apparatus (communication apparatus or Internet connecting apparatus) connected to a LAN side.

FIG. 15 illustrates an overview of the port reuse property. As shown in FIG. 15, when transmitting to a WAN side a packet having a port number [Pa] of an Internet connecting apparatus as a source, the NAT router also uses the port number [Pa] as it is as a WAN side port number, and transmits the port number [Pa] to the WAN side. Similarly, when transmitting a packet having a port number [Pb] of the Internet connecting apparatus as the source, the NAT router uses the port number [Pb] as it is as the WAN side port number. The same applies to a case where a packet having a port number [Pc] as the source is transmitted to the WAN side. As described above, "port reuse" is a property that assigns the port number same as the source port number as the WAN side port number in the packet that includes the source port number from the LAN side apparatus.

In most cases at home, for example, a personal computer (hereinafter referred to as PC) is connected to a private side (LAN side) of a router. When an IP telephone service is additionally started, an IP telephone apparatus and the PC are both connected to the LAN side of the router in many cases. When the router has the port reuse property and, in particular, the PC is connected to the LAN side of the router, the NAT router performs the operation that assigns a port number same as a source port number as a WAN side port number, to a packet that includes the source port number from the PC throughout transfer of a large file between the PC and a WAN side server or another terminal.

Even when the communication terminal apparatus (e.g., IP telephone apparatus), which is connected to the LAN side of the NAT router having the port reuse property as shown in FIG. 14A, controls and performs the above-described the NAT type determination process, and the apparatus normally detects the NAT type as "(7) Restricted cone," a phenomenon described below occurs when the PC and communication terminal apparatus are both connected to the same NAT router as shown in FIG. 14B.

The Internet connecting apparatus (e.g., PC) first connects to the WAN side server using the source port number Pa and starts downloading large data. When the other terminal (IP telephone apparatus) performs the NAT type determination using the source port number Pa during the download, the port number Pb is assigned instead as defined in the NAT router since the WAN side port number Pa was assigned to a communication port on the PC which started communication earlier, and thus the WAN side port number Pa cannot be to used for the IP telephone apparatus which is connected later.

As described above, when a different port number as defined in the NAT router is assigned because of a port number conflict with another apparatus, some NAT routers having the port reuse property operate in a manner similar to symmetric NAT while the port number is assigned. When the NAT type determination process is performed during the operation, the NAT type might be determined as "(5) symmetric." In other words, the router, which functions as "cone" when the LAN-side PC is not used, changes to "symmetric" when the PC starts transferring a file with the WAN side and functions as "symmetric" during the file transfer. When the PC ends the communication, the NAT type returns to "cone." Thus, the NAT type frequently changes according to the operation status of the LAN-side apparatus.

The above-described phenomenon may temporarily stop the IP telephone apparatus from communicating. The NAT type determination process is performed at a frequency of once an hour, for example, in FIG. 16 ($\Delta$ mark). When the LAN-side PC starts external communication, the NAT type changes ($\rightarrow$mark) and the NAT router, which has been restricted cone, changes to symmetric in which a port number is changed per LAN-side terminal. Until the LAN-side IP telephone apparatus recognizes the NAT type change, the IP telephone apparatus performs a process similar to a case where the IP telephone apparatus wrongly recognizes the NAT type, and thus is difficult to properly perform the NAT traversal process. The IP telephone apparatus can detect the change to "symmetric" in the NAT type determination process performed after the NAT router operation has changed. After this point, when the IP telephone apparatus can detect the NAT type of the NAT router, the IP telephone apparatus can perform proper communication control for NAT traversal.

Due to change of the environment to which the NAT router is connected (end of PC communication and the like), however, there may be a case where "restricted cone" is detected in the routine NAT type determination. When the PC starts communication with an external apparatus after the detection, the IP telephone apparatus is difficult to properly perform the NAT traversal process until recognizing the NAT type by performing the NAT type determination. Such a status is repeated depending on the operation environment.

In a case where the NAT type changes according to the router's operation environment as described above, frequent communication repeated between the PC and external apparatus frequently causes a time period when the IP telephone apparatus cannot communicate, thus decreasing usability as a telephone apparatus.

SUMMARY OF THE INVENTION

The present invention is provided to address the above-described problems in the conventional technology. A main object of the present invention is to provide an IP communication apparatus and a NAT type determination method performed by the IP communication apparatus, when a NAT type is determined pursuant to standard technical specifications (RFC 3489), the IP communication apparatus preventing an erroneous NAT type determination while enhancing a range of determination targets (i.e., NAT properties) for a proper determination.

The NAT type determination method performed by the IP communication apparatus according to the present invention includes a first transmission test, a second transmission test, a third transmission test, and a fourth transmission test. In the first transmission test, an IP communication apparatus that performs communication via a relay apparatus having a NAT function, transmits a request to a first destination of a STUN server, the first destination including a first IP address and a first port number. In the second transmission test, the IP communication apparatus transmits to the first destination, a request that contains information that specifies change of a source IP address and a port number in a response. In the third transmission test, the IP communication apparatus transmits a request to a second destination of the STUN server, the second destination including a second IP address and a second port number. In the fourth transmission test, the IP communication apparatus transmits to the first destination, a request that contains information that specifies change of only a source port number in a response. The NAT type determination method further includes a fifth transmission test, where the IP communication apparatus transmits a request to a third destination, which includes at least an IP address or a port number different from the first and second destinations. When finishing the transmission tests to all the destinations at least one time, the IP communication apparatus compares the source address information of the request added in the response from the STUN server in response to the request issued in the latest performed transmission test, and the source address information of the request added in the response from the STUN server in response to the request issued in any of the preceding transmission tests. When the address information are not identical, the IP communication apparatus determines that the NAT type is symmetric.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 12 illustrate an example of NAT property investigation results of an existing router;

FIG. 13 illustrate an example of NAT property investigation results of the existing router;

DETAILED DESCRIPTION OF PREFERRED EMBODIMENTS

Figure 1:
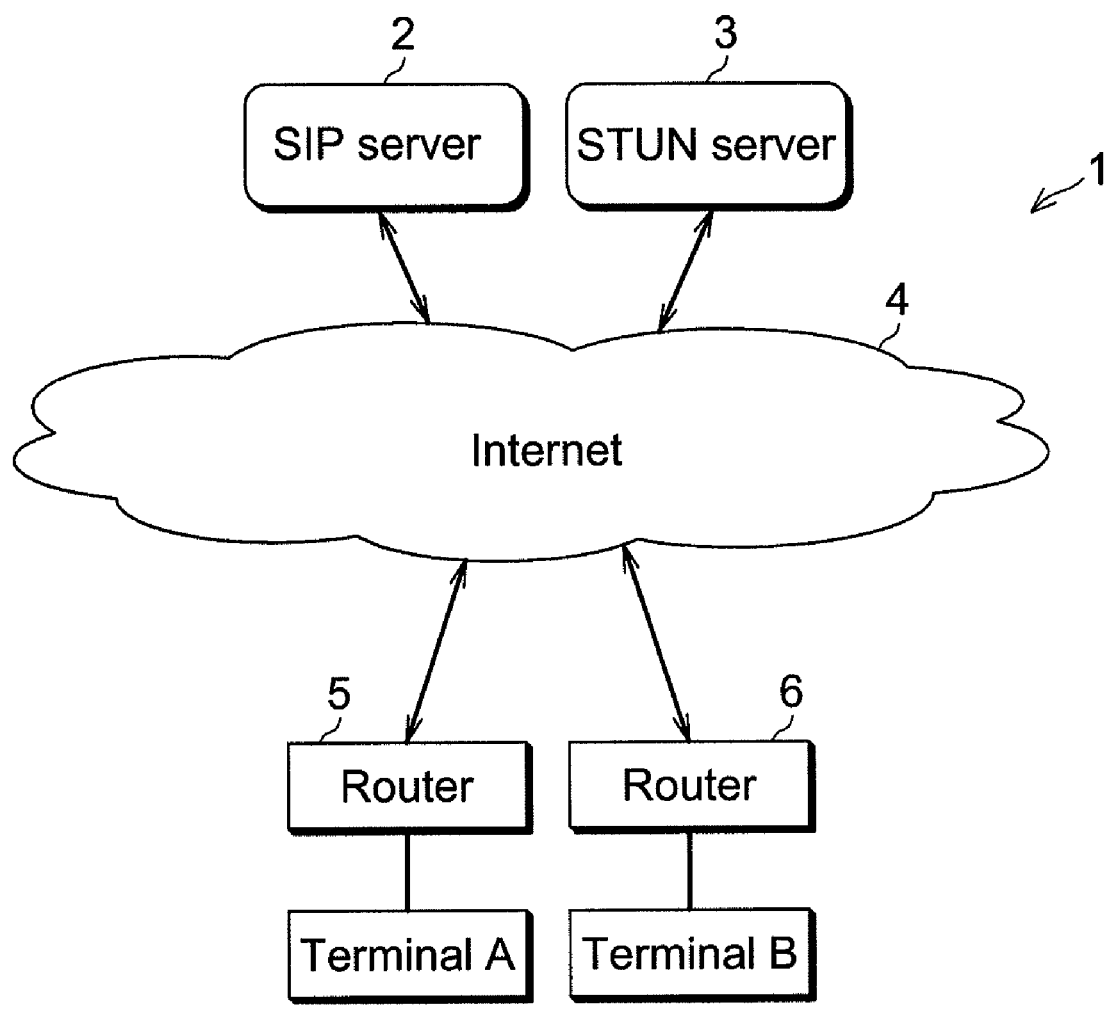
FIG. 1 is a configuration diagram of an IP communication system that includes an IP communication apparatus according to the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A first aspect of the present invention provides a NAT type determination method that includes a first transmission test, a second transmission test, a third transmission test, and a fourth transmission test. In the first transmission test, an IP communication apparatus that performs communication via a relay apparatus having a NAT function, transmits a request to a first destination of a STUN server, the first destination including a first IP address and a first port number. In the second transmission test, the IP communication apparatus transmits to the first destination, a request that contains information that specifies change of a source IP address and a port number in a response. In the third transmission test, the IP communication apparatus transmits a request to a second destination of the STUN server, the second destination including a second IP address and a second port number. In the fourth transmission test, the IP communication apparatus transmits to the first destination, a request that contains information that specifies change of only a source port number in a response. The NAT type determination method further includes a fifth transmission test, in which the IP communication apparatus transmits a request to a third destination, which includes at least an IP address or a port number different from the first and second destinations. When finishing the transmission tests to all the destinations at least one time, the IP communication apparatus compares the source address information of the request added in the response from the STUN server in response to the request issued in the latest performed transmission test, and the source address information of the request added in the response from the STUN server in response to the request issued in any of the preceding transmission tests. When the address information are not identical, the IP communication apparatus determines that the NAT type is symmetric.

The method above enables prevention of an erroneous NAT type determination and enhancement of a range of determination targets (i.e., NAT properties) for a proper determination when the NAT type is determined pursuant to standard technical specifications (RFC 3489). More specifically, even when a relay apparatus (router and the like) designed to change a WAN-side port number (i.e., function as subsequently symmetric NAT) is used to execute transmission tests from a same LAN-side port to three different destinations (at least an IP address or port number is different from a destination address to which a packet was already transmitted), an erroneous NAT type determination can be prevented and a proper determination can be made.

A second aspect of the present invention provides the method in which the first to fourth transmission tests are sequentially executed, and the fifth transmission test is executed when there is no response from the STUN server to the request after the fourth transmission test is executed. The simple method above prevents an erroneous NAT type determination and allows a proper determination.

A third aspect of the present invention provides the method in which the first to fourth transmission tests are sequentially executed, and the fifth transmission test is executed immediately before one of the first to third transmission tests. The simple method above prevents an erroneous NAT type determination and allows a proper determination.

A fourth aspect of the present invention provides the method in which a sixth transmission test is executed after the fifth transmission test is executed. In the sixth transmission test, the IP communication apparatus transmits a request to a fourth destination, which includes at least an IP address or a port number different from the first to third destinations.

A fifth aspect of the present invention provides an IP communication apparatus that has a NAT type determinator, the IP communication apparatus performing communication via a relay apparatus having a NAT function. The NAT type determinator performs a first transmission test, a second transmission test, a third transmission test, and a fourth transmission test. In the first transmission test, the NAT type determinator transmits a request to a first destination of a STUN server, the first destination including a first IP address and a first port number. In the second transmission test, the NAT type determinator transmits to the first destination, a request that contains information that specifies change of a source IP address and a port number in a response. In the third transmission test, the NAT type determinator transmits a request to a second destination of the STUN server, the second destination including a second IP address and a second port number. In the fourth transmission test, the NAT type determinator transmits to the first destination, a request that contains information that specifies change of only a source port number in a response. When performing the transmission tests, the NAT type determinator executes a fifth transmission test, in which the NAT type determinator transmits a request to a third destination, which includes at least an IP address or a port number different from the first and second destinations. When finishing the transmission tests to all the destinations at least one time, the NAT type determinator compares the source address information of the request added in the response from the STUN server in response to the request issued in the latest performed transmission test, and the source address information of the request added in the response from the STUN server in response to the request issued in any of the preceding transmission tests. When the address information are not identical, the NAT type determinator determines that the NAT type is symmetric.

The configuration above enables prevention of an erroneous NAT type determination and enhancement of a range of determination targets (i.e., NAT properties) for a proper determination when the NAT type is determined pursuant to the standard technical specifications (RFC 3489).

A sixth aspect of the present invention provides a NAT type determination method in which an IP communication apparatus routinely performs a NAT type determination process that includes a plurality of transmission tests, the IP communication apparatus performing communication via a relay apparatus having a NAT function. When a result of a preceding determination process indicates that the NAT type is cone, and a result of a current determination process indicates that the NAT type is symmetric, the IP communication apparatus immediately determines that the NAT type of the relay apparatus is symmetric. When the result of the preceding determination process indicates that the NAT type is symmetric, and the result of the current determination process indicates that the NAT type is cone, the IP communication apparatus determines that the NAT type of the relay apparatus is cone only when subsequent results of the determination process indicate that the NAT type is cone sequentially for a predetermined number of times.

Even in a case where the IP communication apparatus is connected to a router that frequently changes the NAT type, when the NAT type is switched to a type easy to perform P2P communication, the method above automatically switches the operation mode after the switched status is stabilized, without requiring a user to manually change the setting. Thereby, the method can ensure communication, and thus secure basic telephone features even when the IP communication apparatus is a telephone apparatus. In addition, the method can switch to inexpensive communication, including P2P communication, wherever possible.

A seventh aspect of the present invention provides an IP communication apparatus that routinely performs a NAT type determination process that includes a plurality of transmission tests, the IP communication apparatus performing communication via a relay apparatus having a NAT function. When a result of a preceding determination process indicates that the NAT type is cone, and a result of a current determination process indicates that the NAT type is symmetric, the IP communication apparatus immediately determines that the NAT type of the relay apparatus is symmetric. When the result of the preceding determination process indicates that the NAT type is symmetric, and the result of the current determination process indicates that the NAT type is cone, the IP communication apparatus determines that the NAT type of the relay apparatus is cone only when subsequent results of the determination process indicate the NAT type is cone sequentially for a predetermined number of times.

Even in a case where the IP communication apparatus is connected to a router that frequently changes the NAT type, when the NAT type is switched to a type easy to perform P2P communication, the method above automatically switches the operation mode after the switched status is stabilized, without requiring a user to manually change the setting. Thereby, the method can ensure communication, and thus secure basic telephone features even when the IP communication apparatus is a telephone apparatus. In addition, the method can switch to inexpensive communication, including P2P communication, wherever possible.

An eighth aspect of the present invention provides an IP communication apparatus that has a NAT type determinator, the IP communication apparatus performing communication via a relay apparatus having a NAT function. The NAT type determinator performs at least a first transmission test, a second transmission test, a third transmission test, and a fourth transmission test. In the first transmission test, the NAT type determinator transmits a request to a first destination of a STUN server, the first destination including a first IP address and a first port number. In the second transmission test, the NAT type determinator transmits to the first destination, a request that contains information that specifies change of a source IP address and a port number in a response. In the third transmission test, the NAT type determinator transmits a request to a second destination of the STUN server, the second destination including a second IP address and a second port number. In the fourth transmission test, the NAT type determinator transmits to the first destination, a request that contains information that specifies change of only a source port number in a response. When a result of a preceding determination process indicates that the NAT type is cone, and a result of a current determination process indicates that the NAT type is symmetric, the NAT type determinator immediately determines that the NAT type of the relay apparatus is symmetric. When the result of the preceding determination process indicates that the NAT type is symmetric, and the result of the current determination process indicates that the NAT type is cone, the NAT type determinator determines that the NAT type of the relay apparatus is cone only when subsequent results of the determination process indicate that the NAT type is cone sequentially for a predetermined number of times.

Even when the NAT type determination operation takes time, the configuration above allows a constant NAT type determination operation without requiring a frequent NAT type determination operation. When the NAT type changes frequently, an operation associated with symmetric NAT is performed, and thus a stable communication can be performed. Further, when the NAT type is switched to cone, the configuration automatically switches the operation mode after the switched status is stabilized. Thereby, the configuration can ensure communication, and thus secure basic telephone features even when the IP communication apparatus is a telephone apparatus. In addition, the method can switch to inexpensive communication, including P2P communication, wherever possible.

A ninth aspect of the present invention provides a NAT type determination method in which an IP communication apparatus routinely performs a NAT type determination process that includes a plurality of transmission tests, the IP communication apparatus performing communication via a relay apparatus having a NAT function. When a result of the NAT type determination process indicates that the NAT type is changed to a type difficult to perform P2P communication, the IP communication apparatus immediately changes the NAT type setting for performing communication. When the result of the NAT type determination process indicates that the NAT type is changed to a type easy to perform P2P communication, the IP communication apparatus changes the NAT type setting only when subsequent results of the determination process indicate the same sequentially for a predetermined number of times.

Even in a case where the IP communication apparatus is connected to a router that changes the NAT type, when the NAT type is frequently changed, the method above operates in a type difficult to perform P2P communication, without requiring a user to manually change the setting. Thereby, the method can perform stable communication. When the NAT type is switched to a type easy to perform P2P communication, the method automatically switches the operation mode after the switched status is stabilized. Thereby, the method can ensure communication, and thus secure basic telephone features even when the IP communication apparatus is a telephone apparatus. In addition, the method can switch to inexpensive communication, including P2P communication, wherever possible.

A tenth aspect of the present invention provides an IP communication apparatus that routinely performs a NAT type determination process that includes a plurality of transmission tests, the IP communication apparatus performing communication via a relay apparatus having a NAT function. When a result of the NAT type determination process indicates that the NAT type is changed to a type difficult to perform P2P communication, the IP communication apparatus immediately changes the NAT type setting for performing communication. When the result of the NAT type determination process indicates that the NAT type is changed to a type easy to perform P2P communication, the IP communication apparatus changes the NAT type setting only when subsequent results of the determination process indicate the same sequentially for a predetermined number of times.

Even in a case where the IP communication apparatus is connected to a router that changes the NAT type, when the NAT type is frequently changed, the configuration above operates in a type difficult to perform P2P communication, without requiring a user to manually change the setting. Thereby, the method can perform stable communication. When the NAT type is switched to a type easy to perform P2P communication, the method automatically switches the operation mode after the switched status is stabilized. Thereby, the method can ensure communication, and thus secure basic telephone features even when the IP communication apparatus is a telephone apparatus. In addition, the method can switch to inexpensive communication, including P2P communication, wherever possible.

The embodiments of the present invention are explained in the following, with reference to the above-described drawings.

FIG. 1 is a schematic configuration diagram of an IP communication system that includes a terminal apparatus as the IP communication apparatus according to the present invention. IP communication system 1 includes a plurality of terminal apparatuses (IP communication apparatuses) A and B, SIP server 2, and STUN server 3, which are connected communicably with each other via the Internet 4 that serves as a wide area network.

Terminal apparatuses A and B have an IP communication function for communicating audio/video data and the like (hereinafter referred to as "media data") via the Internet 4. Terminal apparatuses A and B respectively belong to different LANs (not shown in the drawing), so as to be connected to the Internet 4 via routers (relay apparatuses) 5 and 6 respectively. Terminal apparatuses A and B function as a UAC (User Agent Client) of SIP. In order to explain details on functions and operations of terminal apparatuses A and B in the present embodiments below, terminal apparatuses A and B are treated as IP telephone apparatuses that support SIP, when necessary. However, any terminal apparatus that has an IP communication function may be used as terminal apparatuses A and B.

Routers 5 and 6 are broadband routers having a NAT function for transparently performing conversion between a private (LAN side) IP address and a global (WAN side) IP address. The private IP address is used for communication on the respective LANs for terminal apparatuses A and B. The global IP address is used for external communication through the Internet 4. The NAT function of routers 5 to 6 permits outbound communication, which is initiated from the inside of NAT toward the outside thereof; and basically rejects inbound communication, which is initiated from the outside of NAT toward the inside thereof. Further, the NAT function deletes an entry (registered information) on a NAT conversion table according to such as time elapsed and the like, and thereby serves as a firewall.

Figure 10:
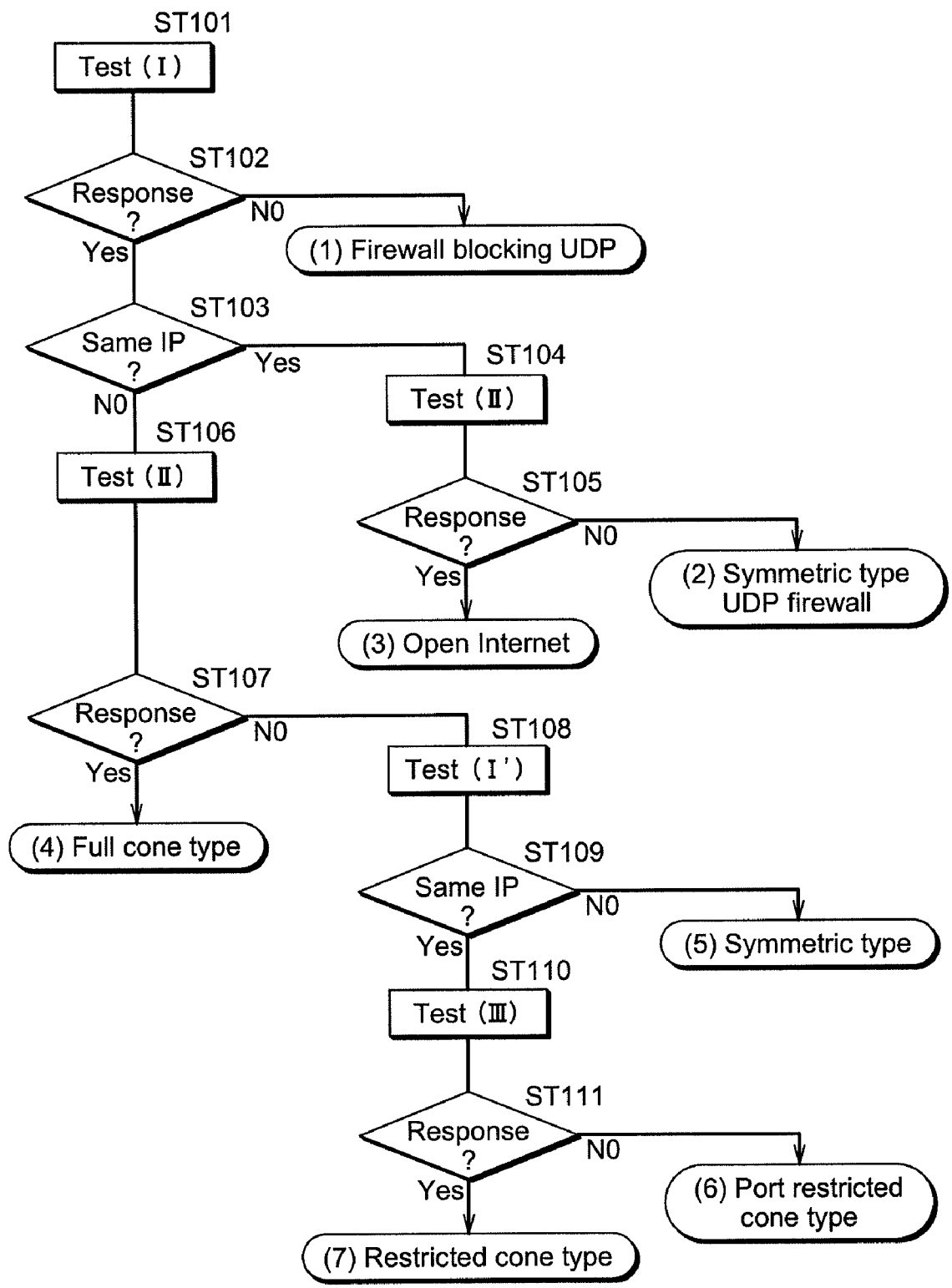
FIG. 10 illustrates a NAT type determination flow as defined in RFC 3489.
Figure 11A:
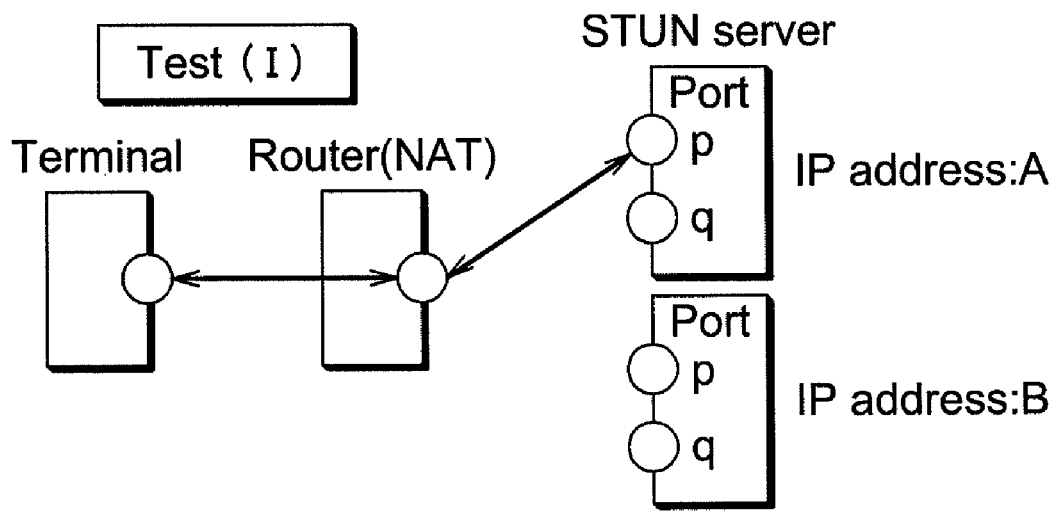
FIGS. 11A to 11D illustrate transmission tests executed for NAT type determination.
Figure 11B:
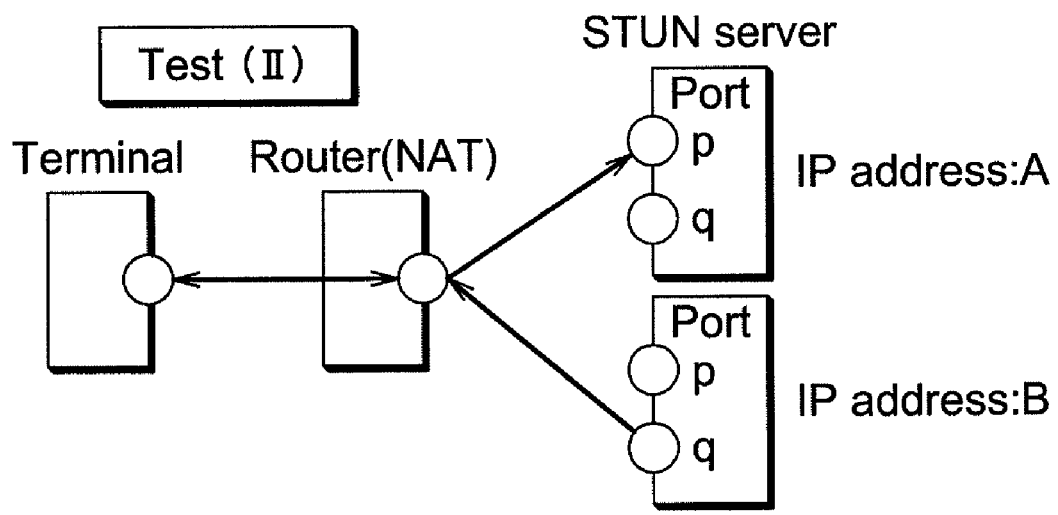
Figure 11C:
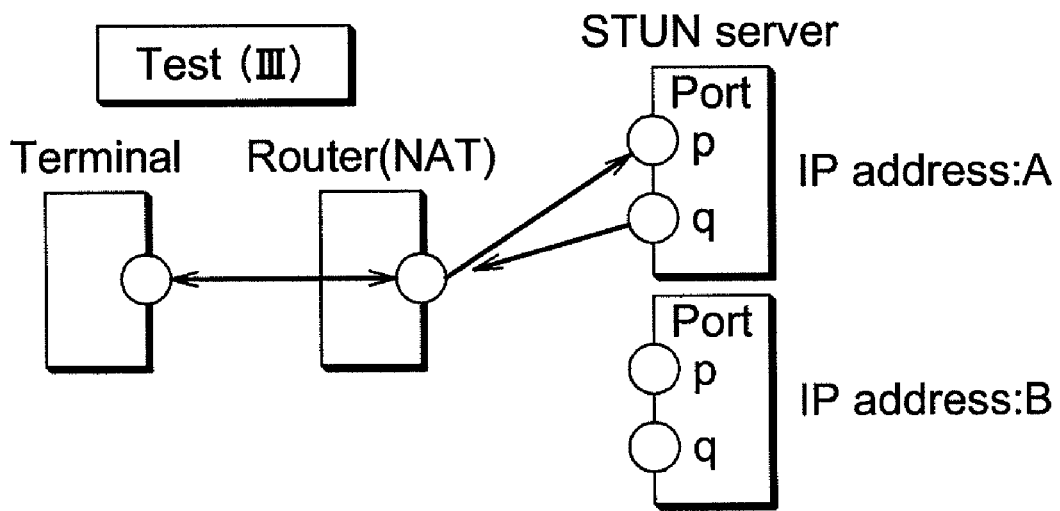
Figure 11D:
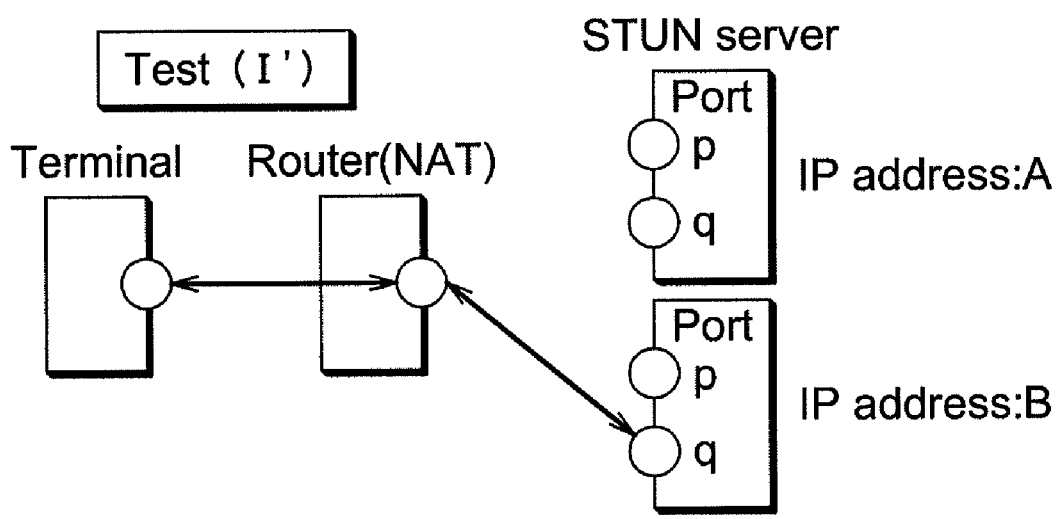
Figure 14A:
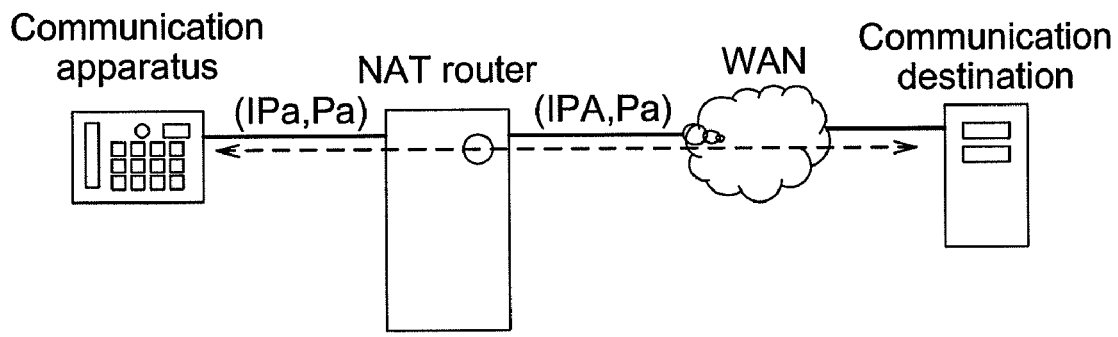
FIGS. 14A and 14B are system configuration diagrams illustrating examples of an operation environment of the IP communication apparatus according to another embodiment of the present invention.
Figure 14B:
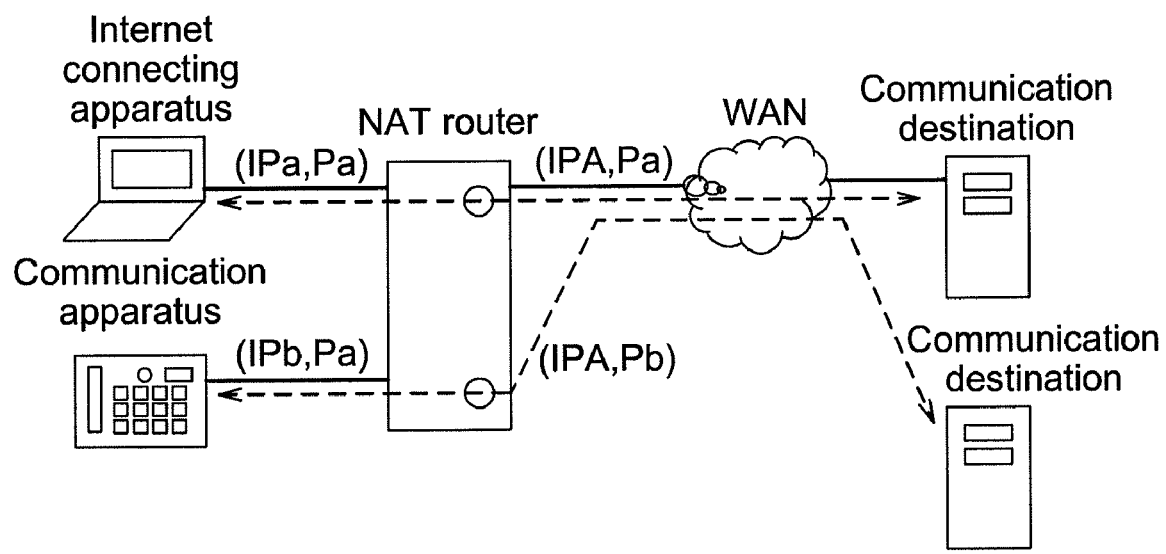
Figure 15:
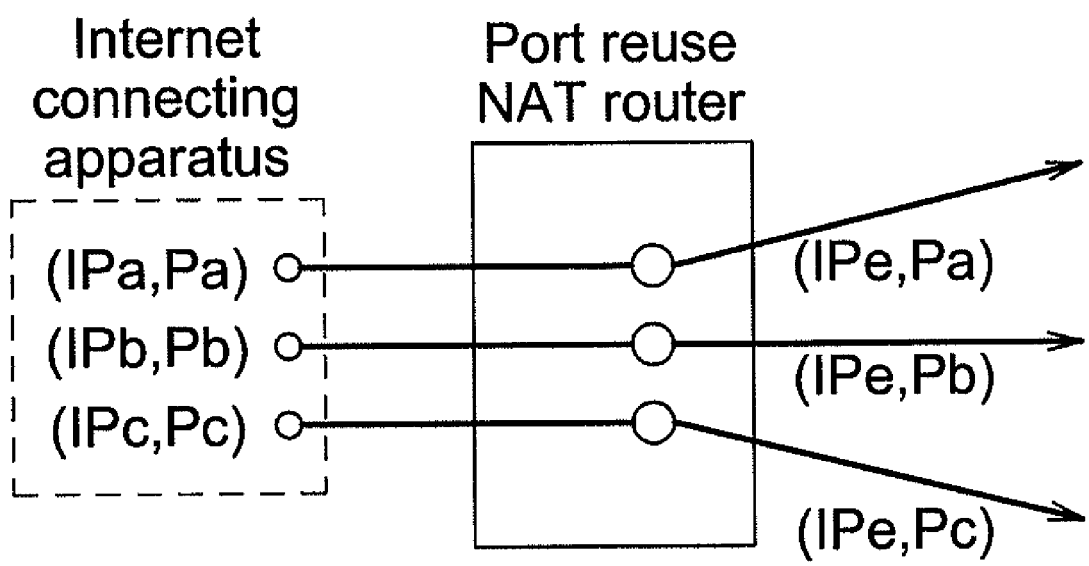
FIG. 15 illustrates an overview of a port reuse property of the existing router.

The term "NAT" used herein is not limited to a technology that performs conversion between private and global IP addresses, but further includes related technologies, including NAPT (Network Address Port Translation), which converts a port number in addition to the IP addresses, and the like. The NAT function of routers 5 and 6 is categorized into one of the NAT types defined by RFC 3489 as shown in FIG. 10 (full cone, restricted cone, port restricted cone, symmetric, and the like) or subsequently symmetric as explained in FIGS. 12 and 13.

SIP server 2 is a call connection server that functions as a UAS (User Agent Server). SIP server 2 relays a connection between terminal apparatuses A and B by transmitting and receiving a SIP message thereto and therefrom. SIP server 2 has a proxy server function and a registrar function. The proxy server function relays location information, a call initiation request and a response, and the like, in order to connect a call between terminal apparatuses A and B in response to a request therefrom. The registrar function manages (i.e., registers in, updates on, deletes from a predetermined database, and the like) information, including a global address, a port number, a NAT type, and the like, which are associated with terminal apparatuses A and B. The terminal apparatuses, whose connection is established through SIP server 2, can perform P2P communication of media data in a media session. In the figure, both terminal apparatuses A and B are configured to access SIP server 2. Terminal apparatuses A and B, however, may be configured to access different proxy servers for communication.

STUN server 3 is a server for providing address information that has a function that notifies information (address information), including a global address, a port number, and the like, of terminal apparatuses A and B in response to a request therefrom. When receiving a binding request from terminal apparatuses A and B, STUN server 3 retrieves source address information from the binding request, and returns a binding response, to which the retrieved information is added as a MAPPED-ADDRESS attribute. Thereby, terminal apparatuses A and B can recognize a global address and port number of routers to which the terminal apparatuses are connected.

In addition, terminal apparatuses A and B can determine the NAT type of routers 5 and 6 by executing a predetermined transmission test to STUN server 3, as described hereinafter. In this case, STUN server 3 is a server that has a plurality of substantial IP addresses and port numbers (Address (A, p), Address (A, q), Address (B, p), and Address (B, q) as shown in FIGS. 11A to 11D in this case).

Figure 2:
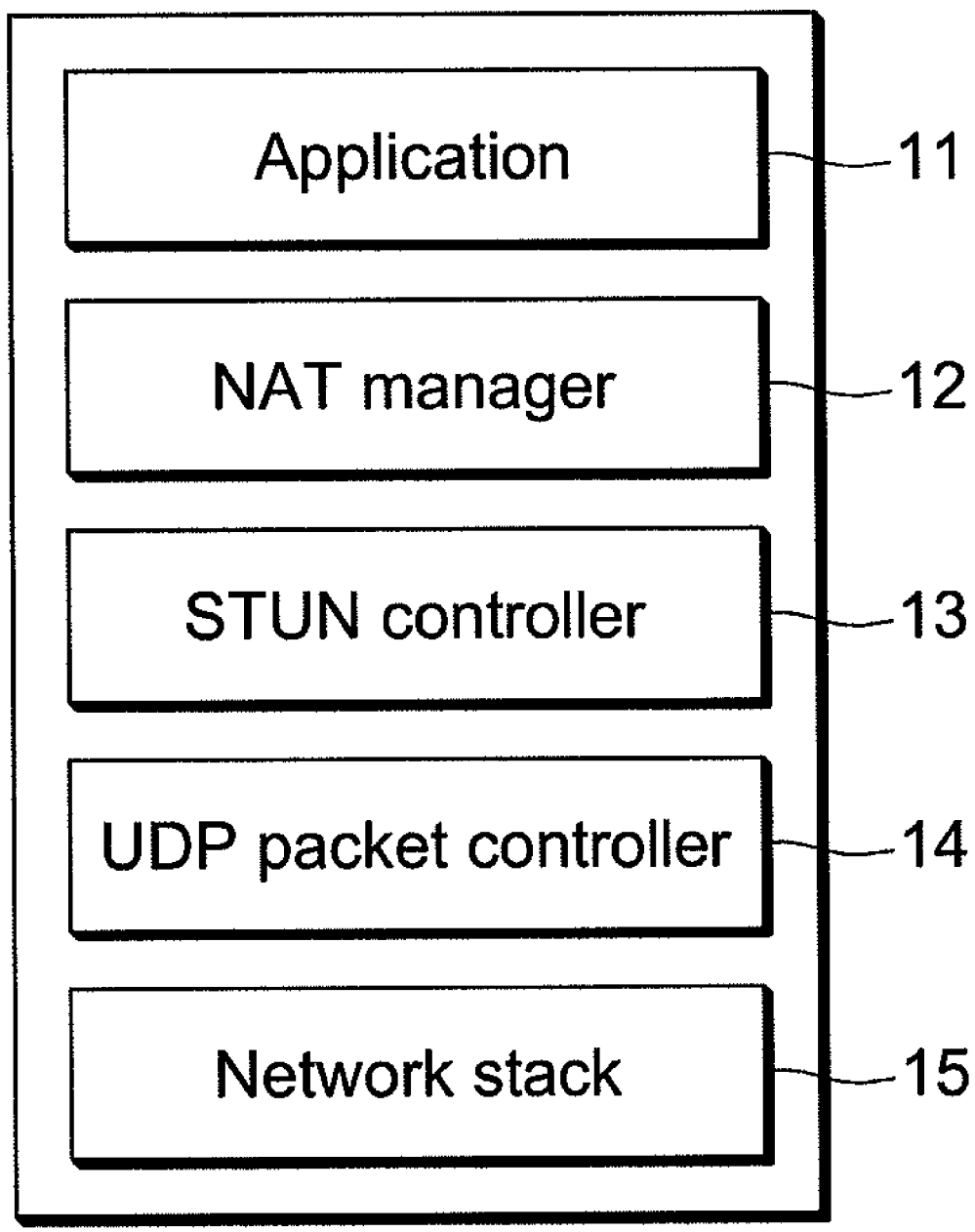
FIG. 2 is a block diagram illustrating a main configuration of the terminal apparatus.

FIG. 2 is a block diagram illustrating a main configuration of the terminal apparatus shown in FIG. 1. Each of terminal apparatuses A and B has application 11, NAT manager (NAT type determinator) 12, STUN controller 13, UDP packet controller 14, and network stack 15. The figure shows the main configuration related to the present invention. In addition to the configuration shown in FIG. 2, terminal apparatuses A and B include a known configuration, such as, for functioning as an IP telephone apparatus.

Application 11 executes a variety of functions that the terminal apparatus provides according to a user's instruction (functions to operate as the IP telephone apparatus herein).

NAT manager 12 causes STUN controller 13 to execute the transmission test prior to a communication with a destination apparatus, and determines the NAT type based on a result thereof. The transmission test is executed by transmitting a binding request to STUN server 3. NAT manager 12 can determine the NAT type, based on whether or not a binding response is received from STUN server 3 in response to the binding request, and information added to the binding response (IP address and port number added as the MAPPED-ADDRESS attribute).

STUN controller 13, which executes a process associated with NAT traversal based on a STUN protocol through communication with STUN server 3, obtains address and NAT type information for NAT traversal.

UDP packet controller 14, which executes a communication process based on UDP or RTP, generates, transmits, and receives a UDP packet and an RTP packet, which is packetized media data (call voice herein).

Network stack 15 controls a network adapter for connecting to the LAN so as to achieve a communication via the Internet 4 based on a predetermined protocol.

The functions of the respective configuration elements shown in FIG. 2 can be provided, for example, when a CPU (Central Processing Unit; now shown in the figure) executes processes following predetermined control programs.

Figure 3:
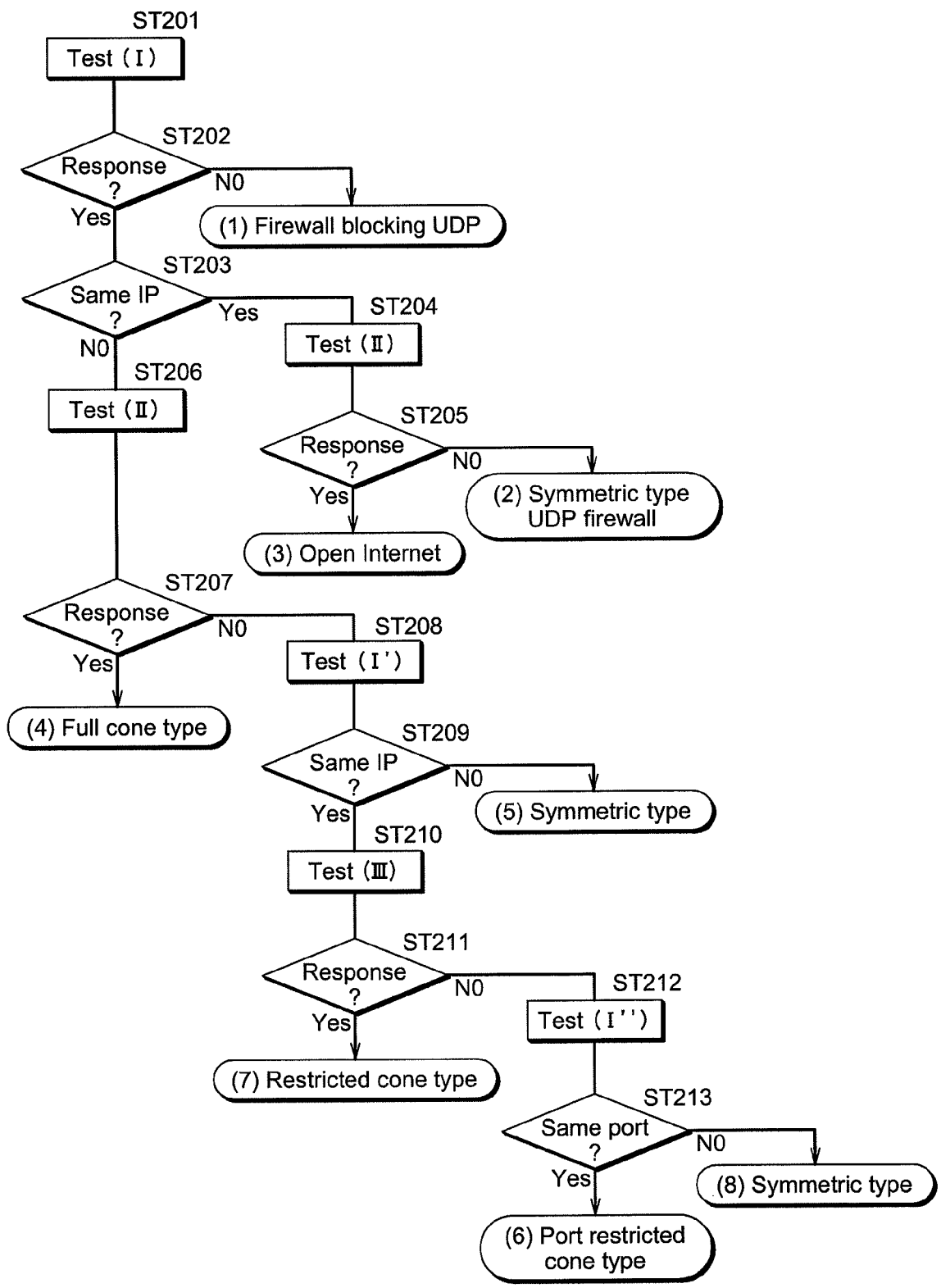
FIG. 3 is a flowchart illustrating a first NAT type determination method performed by the terminal apparatus.

FIG. 3 is a flowchart illustrating a first NAT type determination method performed by the terminal apparatus shown in FIG. 1. In the figure, processes of ST 201 to ST 211 associated with a transmission test (I) (first transmission test), a transmission test (II) (second transmission test), a transmission test (I') (third transmission test), a transmission test (III) (fourth transmission test), and responses from STUN server 3 to the above-described transmission tests correspond to ST 101 to ST 111 shown in FIG. 10 respectively. Thus, the explanations on the processes are omitted herein, and matters not particularly mentioned below are construed the same as the case of FIG. 10.

Figure 4:
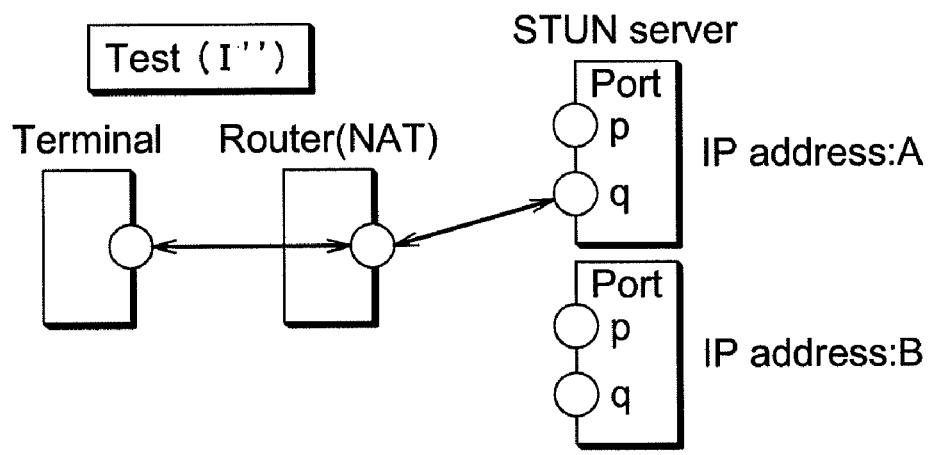
FIG. 4 is a pattern diagram illustrating an example of a transmission test (I")
Figure 5:
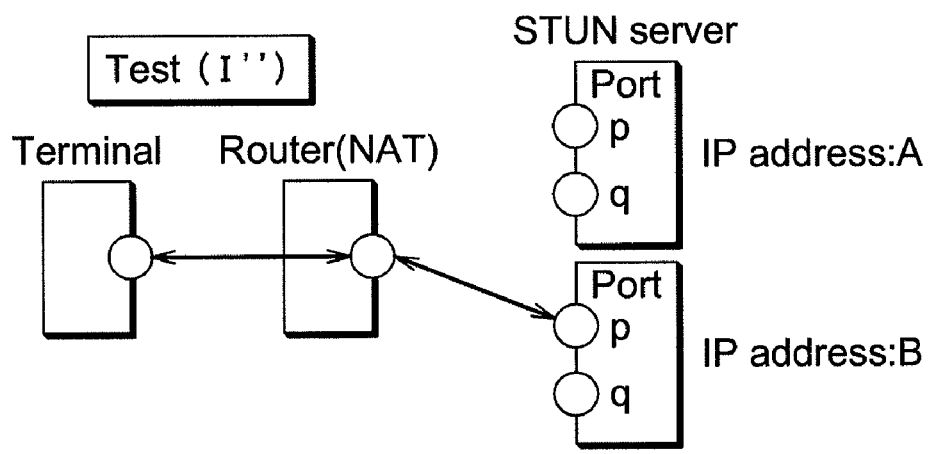
FIG. 5 is a pattern diagram illustrating a different example of the transmission test (I")

In FIG. 3, when the terminal apparatus receives no binding response from STUN server 3 to the transmission test (III) (ST 211: No), the terminal apparatus further executes the transmission test (I") (fifth transmission test) (ST 212). In the transmission test (I"), as shown in FIG. 4, the terminal apparatus transmits via the router, a binding request to a third destination of STUN server 3, which is Address (A, q). Similar to the transmission test (I), a CHANGE-REQUEST attribute is not specified in this case. The third destination does not need to be Address (A, q), but may be an address in which at least the IP address or port number is different from the first destination in the transmission test (I) and the second destination in the transmission test (I'). As shown in FIG. 5, for instance, the transmission test (I") can be performed to Address (B, p), which is the third destination of STUN server 3. Execution of the transmission test (I") completes transmission of test packets to three different destinations from the same LAN-side port number.

When the terminal apparatus receives a binding response from the STUN server in response to the binding request in the transmission test (I"), the terminal apparatus determines whether or not the port number added as the MAPPED-ADDRESS attribute is identical to the port number added as the MAPPED-ADDRESS attribute in the preceding transmission test (I) (ST 213). When the port numbers are identical, the terminal apparatus determines that the NAT type is "(6) port restricted cone." Conversely, when the port numbers are not identical, the terminal apparatus determines that the NAT type is "(8) symmetric (subsequent)." As explained in FIGS. 11A to 11D and 12, "(8) symmetric (subsequent)" indicates a NAT property where a WAN-side port number changes when packets are transmitted to three different destinations from the same LAN-side port number.

A second NAT type determination method is explained below. Either the first or second NAT type determination method only needs to be selected; both the methods need not be performed redundantly.

Figure 6:
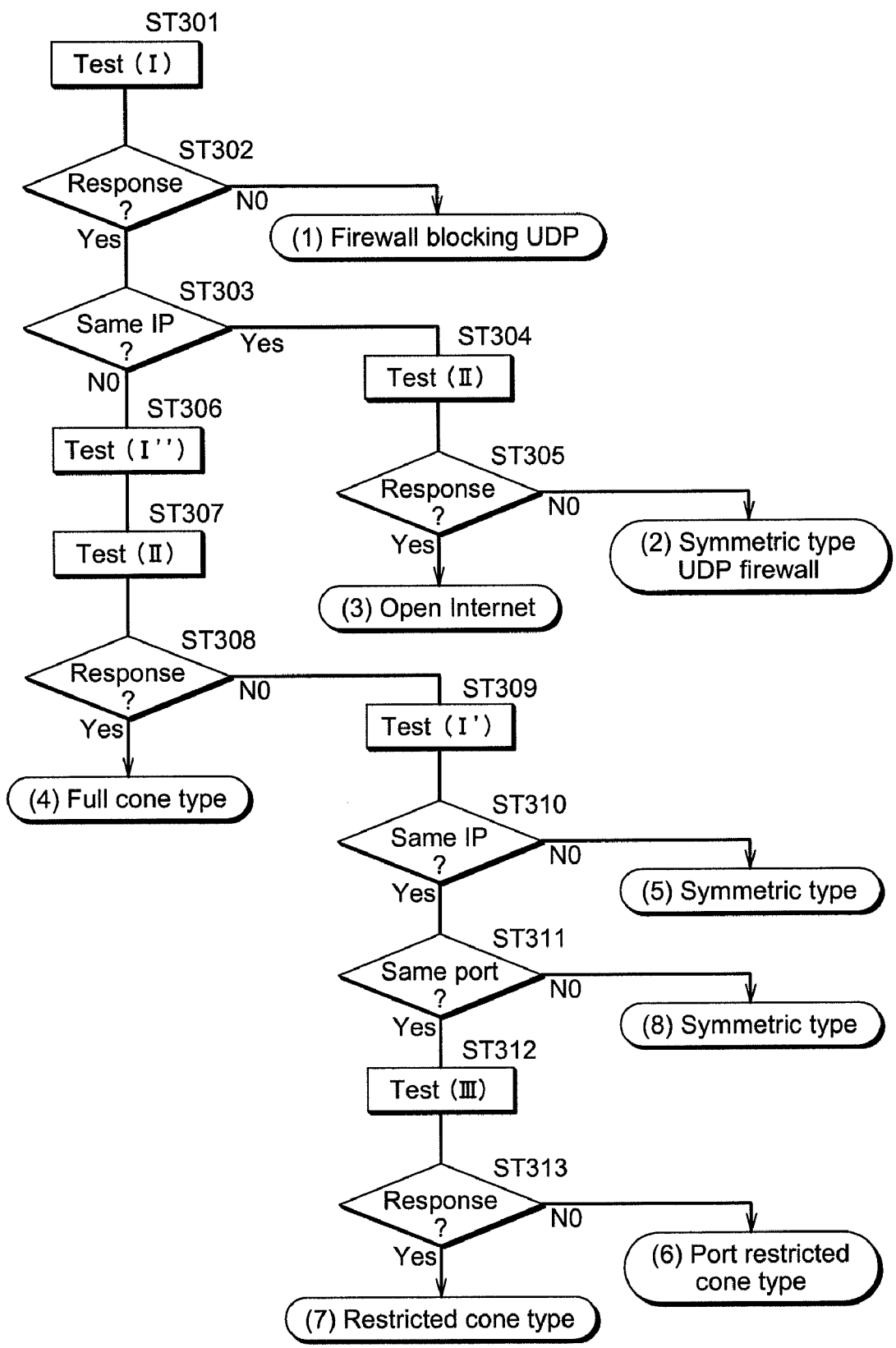
FIG. 6 is a flowchart illustrating a second NAT type determination method performed by the terminal apparatus.

FIG. 6 is a flowchart illustrating the second NAT type determination method performed by the terminal apparatus shown in FIG. 1. In the figure, ST 301 to ST 305 correspond to ST 101 to ST 105 shown in FIG. 10 respectively; ST 307 to ST 310 correspond to ST 106 to ST 109 shown in FIG. 10 respectively; and ST 312 and ST 313 correspond to ST 110 and ST 111 shown in FIG. 10 respectively. Thus, the explanations on the processes are omitted herein, and matters not particularly mentioned below are construed the same as the case of FIG. 10.

In FIG. 6, when the terminal apparatus receives a binding response from STUN server 3 in response to the transmission test (I) and determines that the IP address added as the MAPPED-ADDRESS attribute is not identical to the private IP address of the terminal apparatus (ST 303: No), the terminal apparatus executes the transmission test (I") (fifth transmission test) (ST 306). In the transmission test (I"), similar to ST 212 in FIG. 3, the terminal apparatus transmits via the router, a binding request to the third destination of STUN server 3, which is Address (A, q).

The transmission test (I") corresponds to the second packet transmission to a different destination (the transmission test (I) in ST 301 is the first transmission). Execution of the transmission test (I') in ST 309 completes the third packet transmission to the different destination.

When the terminal apparatus determines that the IP addresses are identical (ST 310: Yes), the terminal apparatus further determines whether or not the port number added as the MAPPED-ADDRESS attribute in the binding response is identical to the port number added as the MAPPED-ADDRESS attribute in the preceding transmission test (I) (ST 311).

When the port numbers are not identical, the terminal apparatus determines that the NAT type is "(8) symmetric (subsequent)." When the port numbers are identical, the terminal apparatus proceeds to the transmission test (II) (ST 312). Similar to the case in FIG. 3, "(8) symmetric (subsequent)" indicates the NAT property where the WAN-side port number changes when packets are transmitted to three different destinations from the same LAN-side port number.

Since the terminal apparatus determines whether or not the port numbers are identical (ST 311) after determining whether or not the IP addresses are identical in ST 309 (ST 310), when only the port number changes, the terminal apparatus can determine the NAT type as "(8) symmetric (subsequent)," differentiating from "(5) symmetric." In addition, execution of the transmission test (I") in ST 306 is intended to be the third packet transmission to the different destination in the transmission test (I') in ST 309. Thus, the transmission test (I") is not limited to the case shown in FIG. 6, but may be executed immediately before the transmission test (I) in ST 301 or the transmission test (I') in ST 309 (after ST 308). Further, the transmission test (I") may be executed after the transmission test (I') (ST 309) as the third packet transmission to the different destination, after which the terminal apparatus may determine whether or not the port numbers are identical, similar to ST 311.

Figure 7:
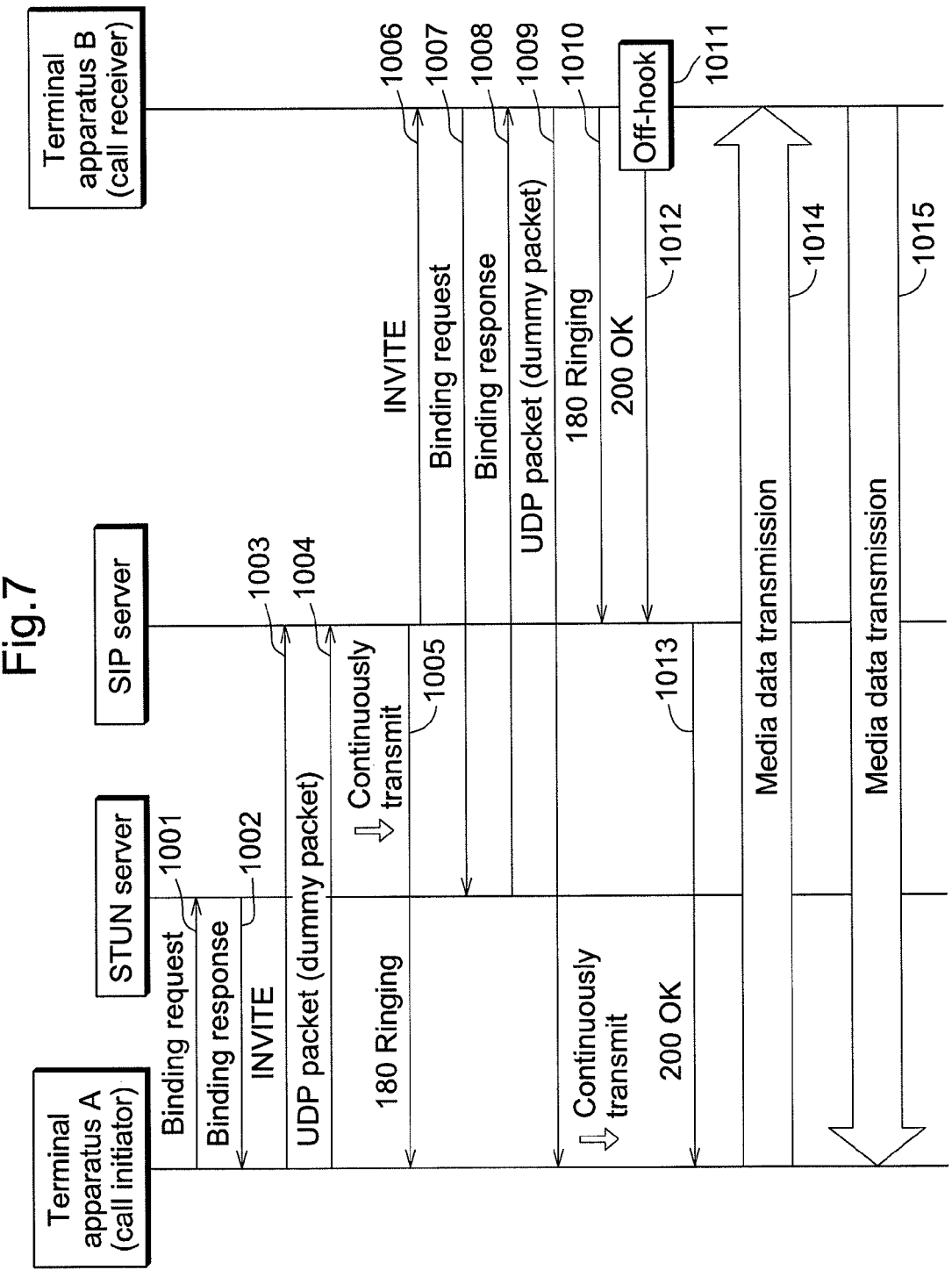
FIG. 7 is a sequence diagram illustrating an example of a communication process executed in the IP communication system.

FIG. 7 is a sequence diagram illustrating an example of a communication process executed in the IP communication system shown in FIG. 1. The figure illustrates a procedure where terminal apparatus A (call initiating side) establishes a connection with terminal apparatus B (call receiving side) via SIP server 2, and executes transmission and reception of media data. The NAT type is determined for terminal apparatuses A and B before the communication process.

Terminal apparatus A first transmits a binding request to STUN server 3 (1001). When receiving the binding request, STUN server 3 transmits to terminal apparatus A, a binding response, to which global address and port number information of the source (router 5) of the binding request are added as the MAPPED-ADDRESS attribute (1002). Then, terminal apparatus A transmits to SIP server 2, an INVITE request, to which the global address and port number information of terminal apparatus A is added (1003). Subsequently, in order to keep the port number to which the binding request was transmitted, terminal apparatus A starts transmitting to SIP server 2, a UDP packet (dummy packet) (1004). UDP packet transmission is continuously executed at a predetermined time interval until the communication ends.

When receiving the INVITE request from terminal apparatus A, SIP server 2 transmits to terminal apparatus A a 180 ringing message that notifies that a call is being made (1005), and further forwards to terminal apparatus B the received INVITE request (1006).

When receiving the INVITE request, terminal apparatus B transmits a binding request to STUN server 3 (1007), similar to terminal apparatus A, and then obtains global address and port number information of terminal apparatus B from a binding response from STUN server 3 (1008). Subsequently, in order to keep the port number to which the binding request was transmitted, terminal apparatus B starts transmitting a UDP packet (dummy packet) (1009). Further, when ready for being called, terminal apparatus B transmits to SIP server 2, a 180 ringing message that notifies that a call is being made (1010).

When detecting an off-hook operation by a user (1011), terminal apparatus B transmits to SIP server 2, a 200 OK message that notifies the user's response (1012). When receiving the 200 OK message, SIP server 2 transmits the message to terminal apparatus A (1013). In the 200 OK message, the global address and port number information of the call-receiving side, which was obtained in communication 1008 from STUN server 3, is added. The global address and port number information added herein, however, may be different from the values from STUN server 3 when the NAT type of the call-receiving side is symmetric.

When the connection is established through the communications above, terminal apparatuses A and B transmit to and receive from each other, media data (call voice herein) as an RTP packet in a media session (1014 and 1015). Explanations on an end of the session after an on-hook operation and the like are omitted.

In the above-described communication process, terminal apparatus A transmits packets to four different destinations (at least the IP number or port number is different) in transmission of the binding request (1001), the INVITE request (1003), the UDP packet (1004), and the media data (1016). Thus, when router 5 has the NAT property determined as "(8) symmetric (subsequent)" in the NAT type determination method shown in FIG. 3 and FIG. 6, router 5 functions as subsequently symmetric NAT in the communications to establish the connection.

NAT manager 12 of terminal apparatus A can change the LAN-side port number used for communication to a value different from a value used in the preceding communication, before starting the communication (e.g., The terminal apparatus changes the port number from 10000, which was used in the preceding communication, to 20000 for new communication). The change allows the first transmitted binding request to be surely addressed to the first destination. Thereby, the timing of the third packet transmission to the different destination can be surely recognized, and thus an appropriate communication can be executed. When the NAT type of at least terminal apparatus A or B is "(8) symmetric (subsequent)," it may be required that a P2P communication be canceled in advance or that transmission and reception of the media data be performed via an exclusive relay server (e.g., TURN (Traversal Using Relay NAT) server and the like).

In the communication process shown in FIG. 7, using the router that has the NAT property where the WAN-side port number changes when the fourth packet is transmitted to a different destination from the same LAN-side port number, may also adversely impact the communication between the terminal apparatuses. In order to allow the router having such specifications to properly determine the NAT type, the NAT type determination methods shown in FIGS. 3 and 6 can be modified as shown in FIGS. 8 and 9 described below.

Figure 8:
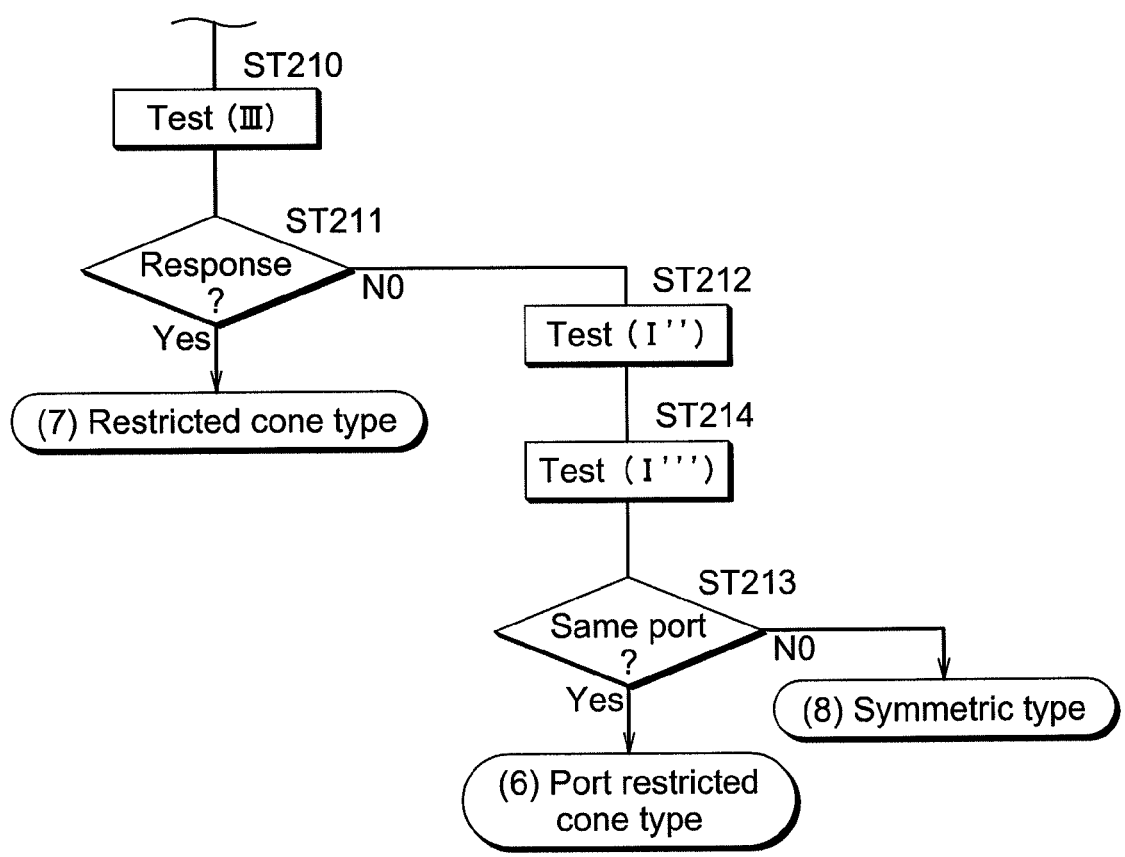
FIG. 8 is a flowchart illustrating a modification example of the first NAT type determination method in FIG. 3.

FIG. 8 is a flowchart illustrating a modification example of the first NAT type determination method. The modified NAT type determination method is the same as the method shown in FIG. 3, except that a test (I''') (sixth transmission test) is executed after execution of the transmission test (I'') of ST 212 (ST 214). In the transmission test (I'''), the terminal apparatus transmits a binding request to a fourth destination, in which at least the IP address or port number is different from the first to third destinations. For instance, when a binding request was transmitted to Address (A, q) in the transmission test (I''), a binding request is transmitted to Address (B, p) in the transmission test (I''').

Figure 9:
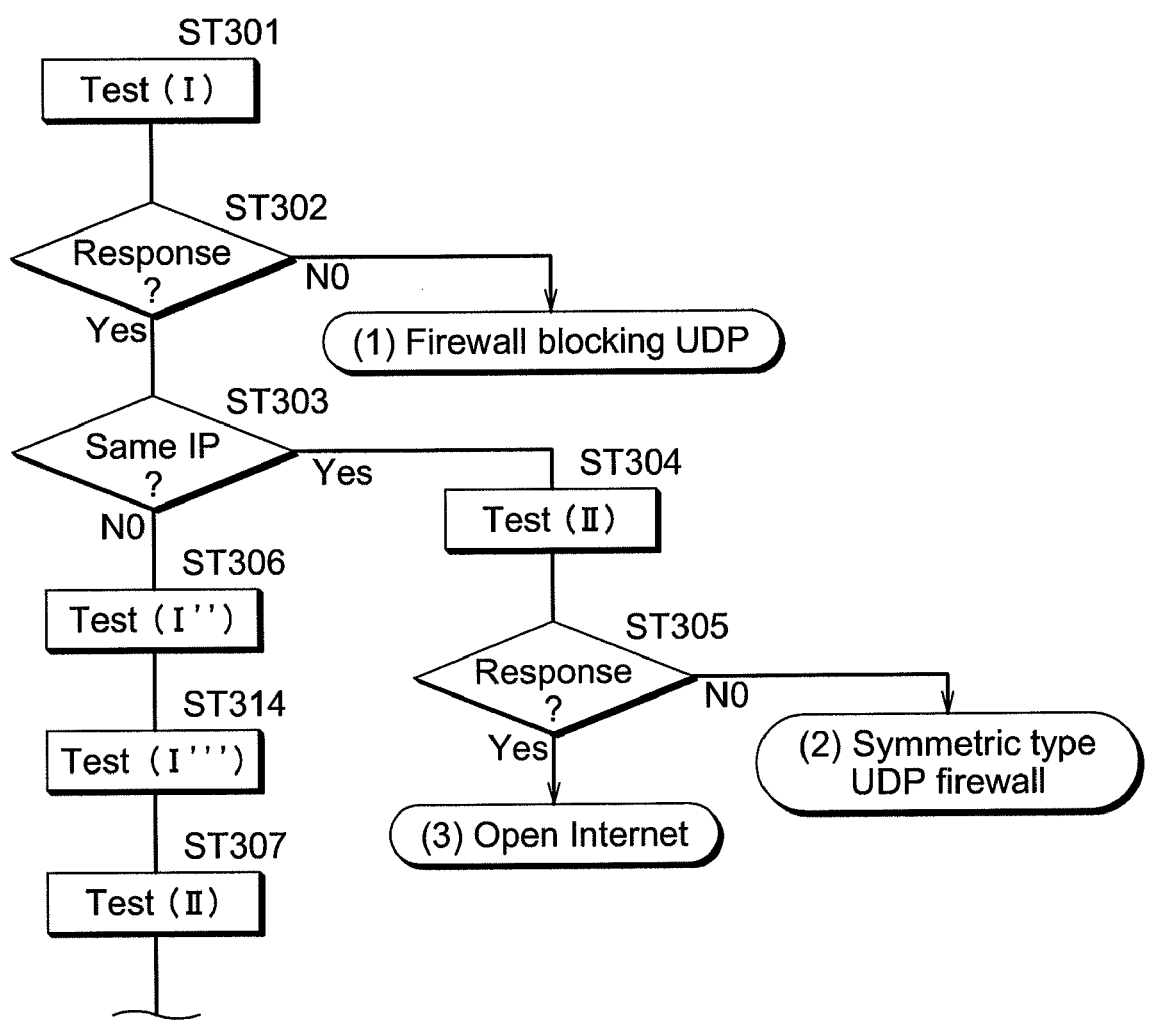
FIG. 9 is a flowchart illustrating a modification example of the second NAT type determination method in FIG. 6.

FIG. 9 is a flowchart illustrating a modification example of the second NAT type determination method. The modified NAT type determination method is the same as the method shown in FIG. 6, except that the test (I''') (sixth transmission test) is executed after execution of the transmission test (I'') in ST 306 (ST 314). In the transmission test (I'''), similar to the case in FIG. 8, the terminal apparatus transmits a binding request to the fourth destination, in which at least the IP address or port number is different from the first to third destinations.

Employing the methods shown in FIGS. 8 and 9 allows the terminal apparatus to properly determine the NAT type while preventing an erroneous determination, even when the router is used having the NAT property where the WAN-side port number changes when packets are transmitted to four different destinations from the same LAN-side port.

Another embodiment is explained below, which supports a router whose NAT type is automatically switched.

As described above, a personal computer (hereinafter referred to as PC) is connected to a private side (LAN side) of a router at home in general, and in many cases a telephone apparatus for IP telephone is also connected thereto. When the router has a port reuse property, the NAT type frequently changes according to PC connection or PC's operation status, particularly when the PC is connected to the LAN side of the router. When a terminal apparatus (e.g., IP telephone apparatus) routinely performs a NAT type determination process, so as to shorten a determination process cycle, the terminal apparatus can recognize a latest NAT type. The determination process, however, also interrupts start of communication. Particularly, the IP telephone apparatus is affected when making and receiving a call. Since the above-described plurality of transmission tests are performed in the NAT type determination process, one determination process requires a time of several ten seconds, and thus limiting a capability to always recognize the latest NAT type.

In the present embodiment, an IP communication apparatus that performs communication via a relay apparatus having a NAT function, has a NAT type determinator that routinely performs a NAT type determination process. When a result of a preceding determination process indicates that the NAT type is cone and when a result of a current determination process indicates the NAT type is symmetric, the NAT type determinator immediately determines that the NAT type of the router is symmetric. When the result of the preceding determination process indicates that the NAT type is symmetric and when the result of the current determination process indicates that the NAT type is cone, the NAT type determinator determines that the NAT router type is cone only when subsequent results of determination process indicate that the NAT type is cone sequentially for a predetermined number of times.

Figure 17:
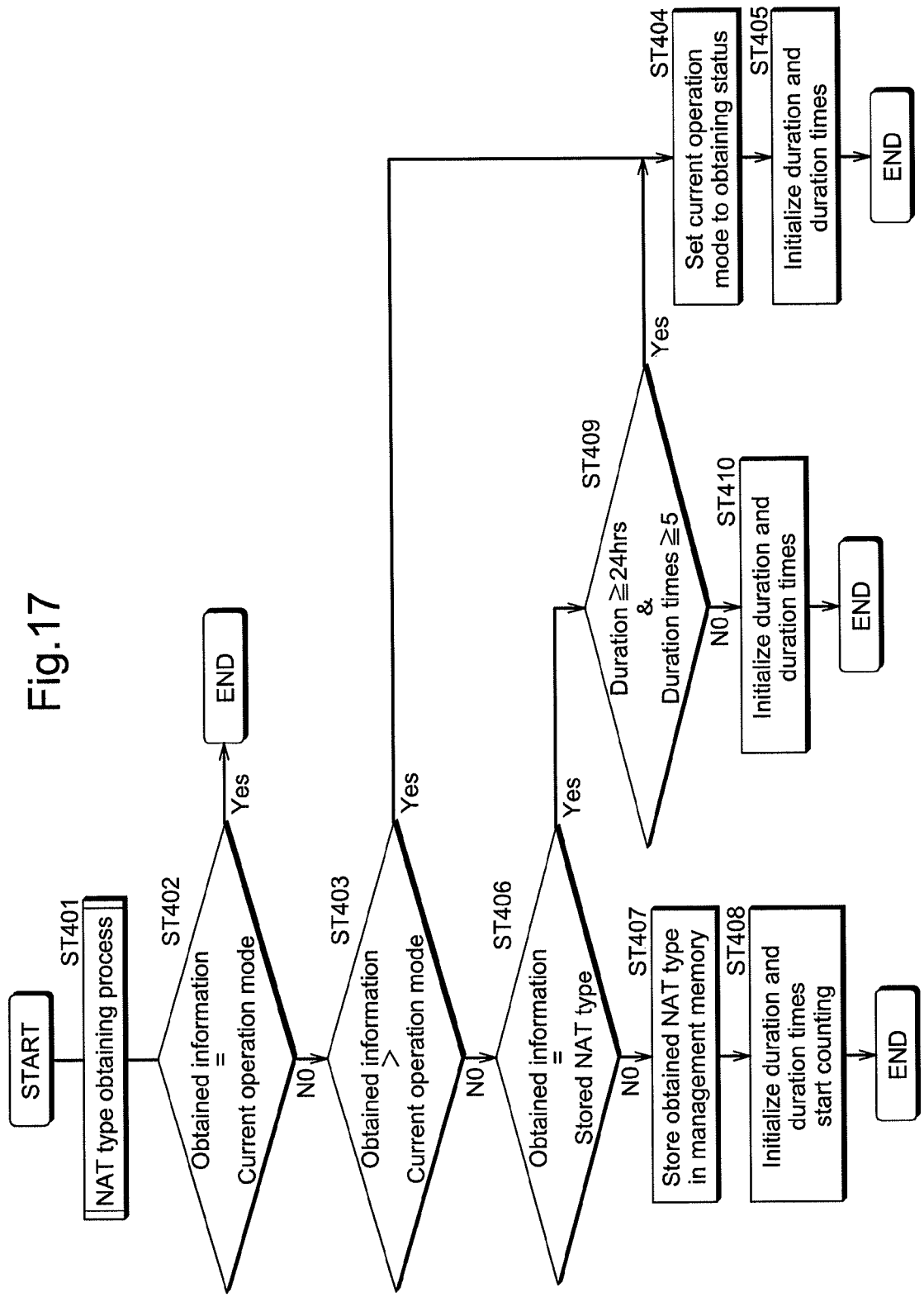
FIG. 17 is a flowchart illustrating an example of a NAT type determinator according to the present embodiment.

An example of NAT type determination according to the present embodiment is explained below with reference to FIG. 17. The NAT type determination process is routinely performed at a frequency of once per hour, for example. First, the NAT type is obtained in the process shown in FIG. 3 or 6, for instance (ST 401).

Then, it is determined whether or not the obtained latest NAT type coincides with an operation mode at the time (ST 402). When the NAT type coincides, it is determined that no change has occurred, and then the determination process ends.

When the obtained latest NAT type does not coincide with the operation mode at the time (ST 402: No), a difficulty level of NAT traversal is compared (ST 403). In ST 403, it is compared whether or not the difficulty level of the obtained latest NAT type is higher than the NAT type set at the time to the terminal (the terminal operates according to the operation mode of the NAT type). When the NAT type is changed from an easy type (e.g., full cone) to a difficult type (restricted cone) (ST 403: Yes), the operation mode of the terminal is immediately changed according to the obtained latest NAT type (ST 404). Then, a management counter, which counts duration and the number of duration times, is initialized (ST 405), and the determination process ends.

When the comparison result in ST 403 is No (e.g., when NAT is changed from the difficult restricted cone type to the easy full cone type), it is determined whether or not the obtained latest NAT type coincides with information stored in a management memory (ST 406). When the obtained latest NAT type does not coincide with the information stored in the management memory (ST 406: No), the obtained latest NAT type information is stored in the management memory (ST 407). Then, the management counter, which counts the duration and the number of duration times, is initialized, and counting starts from the status (ST 408). The management memory is provided in order to store the latest NAT type detected in the NAT type determination process executed immediately before.

When the obtained latest NAT type coincides with the information stored in the management memory as the comparison result (ST 406: Yes), it is checked whether or not count values of the duration and the number of duration times meet conditions for switching the setting (ST 409). When the management counter values have yet to reach a predetermined number of times or a predetermined time elapsed since NAT was changed to an easy type (ST 409: No), the management counter, which counts the duration and the number of duration times, is initialized (ST 410), and then the determination process ends.

In the present embodiment, the conditions for switching the setting are that the number of times of the same status since NAT was changed from a difficult type to an easy type reaches a predetermined number of times of 5, and that the time elapsed since NAT was changed to the easy type is 24 hours or more. In ST 409, when the management counter values reach the predetermined number of times of 5 and the elapsed time of 24 hours or more, the process proceeds to ST 404, and then the operation mode of the terminal is changed according to the obtained latest NAT type. Further, the duration and the number of duration times are initialized (ST 405), and then the determination process ends.

Figure 18:
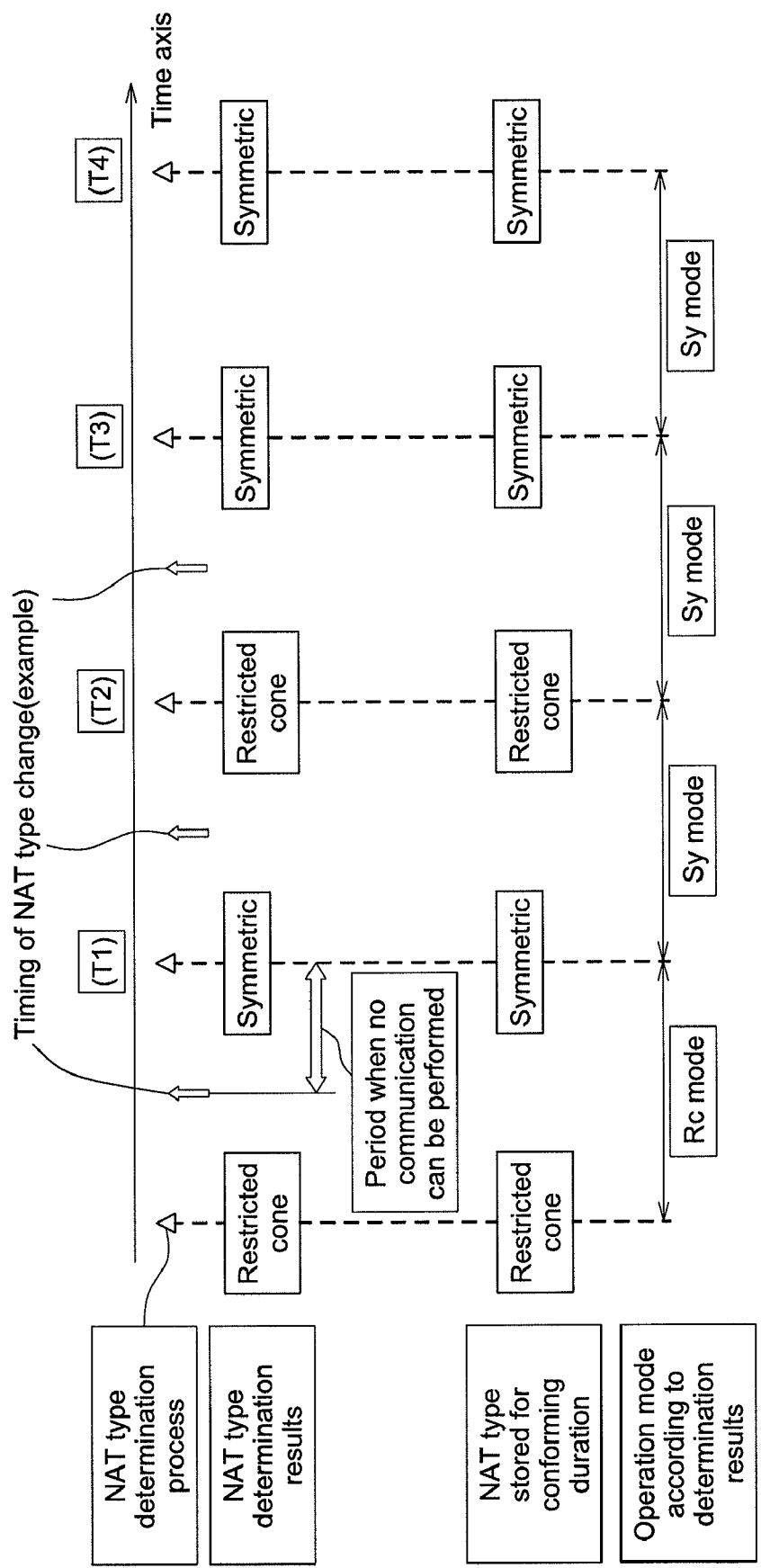
FIG. 18 is a sequence diagram illustrating NAT type determination according to the present embodiment and change in terminal operation mode.

An operation example is explained with reference to FIG. 18. The NAT type determination process shown in FIG. 17 is routinely performed at a frequency of once per hour (Δ mark). The NAT router operates in restricted cone; and the connected IP telephone apparatus operates while being set on the premise of restricted cone (RC mode: A NAT router automatically operates in restricted cone, and a call is performed in P2P communication without a relay server). When the NAT type changes (→mark) as a LAN-side PC starts external communication at a certain point, the router, which has been operating in restricted cone, changes the NAT type to symmetric, in which a port numbers is changed per LAN-side terminal. The IP telephone apparatus can recognize "symmetric" in the NAT type determination process first performed after the change (T1). However, the IP telephone apparatus cannot communicate during a period from the NAT type change through T1.

When the IP telephone apparatus detects "symmetric" in the NAT type determination process (T1), the apparatus is switched to the setting on the premise of symmetric (Sy mode: Under an environment where a NAT router operates in restricted cone, a call is performed via a relay server when an IP address and port number are stored in the relay server as NAT traversal information). When the IP telephone apparatus is set to symmetric, storing the IP address and port number in the relay server as the NAT traversal information enables a call via the relay server.

After the NAT type determination process (T1), the NAT type changes before a subsequently executed determination process (T2) (→mark), and the NAT router, which has been symmetric, is returned to restricted cone. Even when the NAT router automatically returns to restricted cone, the IP telephone apparatus can perform a call via the relay server. The IP telephone apparatus detects "cone" in the subsequent NAT type determination process (T2), but the apparatus does not switch the setting unless the number of times to detect "cone" reaches a predetermined number, and maintains the setting on the premise of symmetric (Sy mode).

After the NAT type determination process (T2), when the LAN-side PC starts external communication again before a subsequently executed determination process (T3), the NAT type changes to symmetric again, but the IP telephone setting does not change. After detecting "symmetric" in the determination process (T1) since the preceding NAT type change to symmetric, the IP telephone apparatus maintains the setting on the premise of symmetric (Sy mode).

Figure 19:
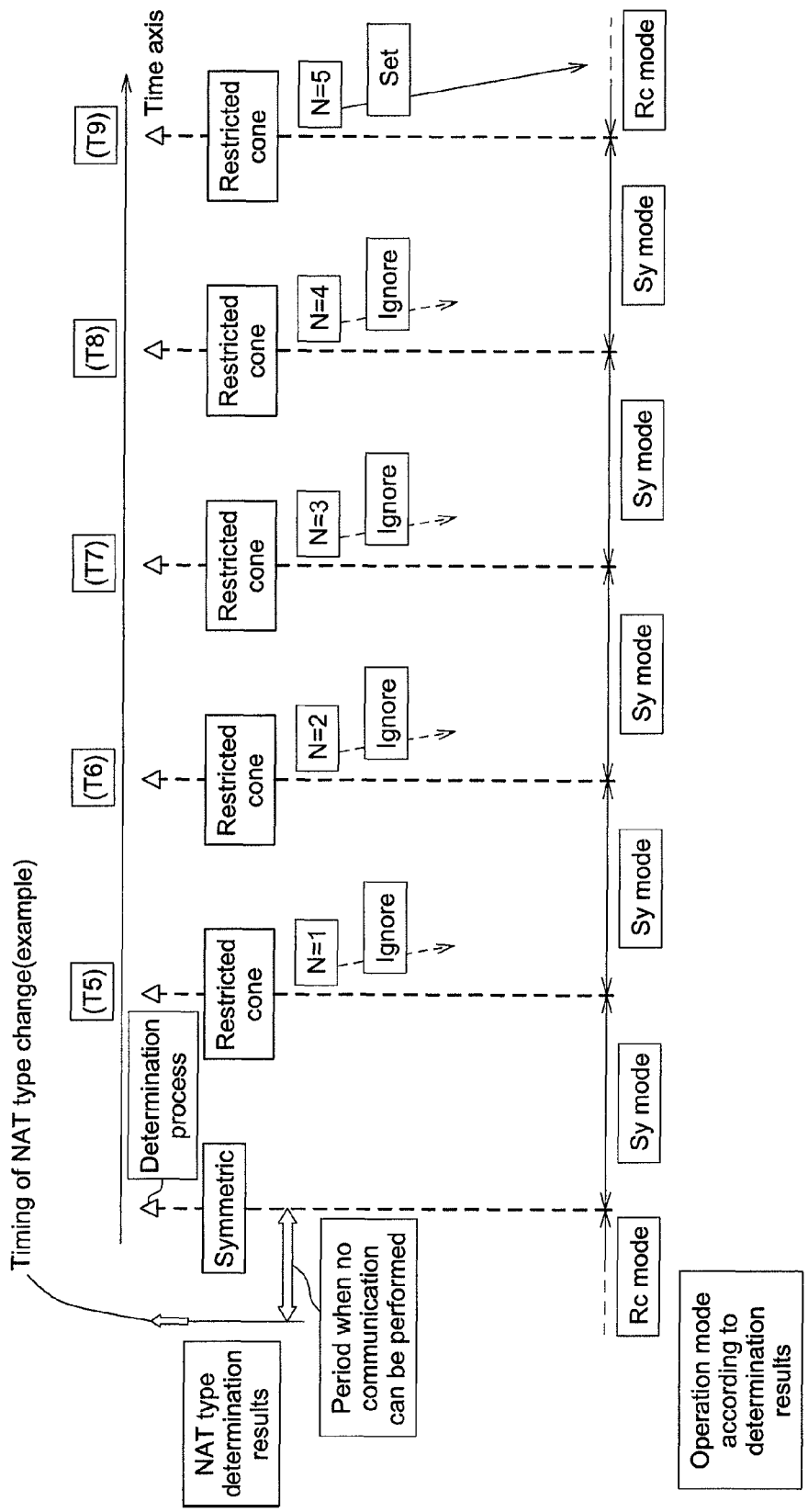
FIG. 19 is a sequence diagram illustrating NAT type determination according to the present embodiment and change in terminal operation mode.

Explained below is an operation example of a case where the IP telephone apparatus returns to the setting on the premise of restricted cone (RC mode), with reference to FIG. 19. As described above, once being switched to the setting on the premise of symmetric, the IP telephone apparatus does not change the setting and maintains the setting on the premise of symmetric, unless the number of times to detect "cone" reaches the predetermined number. In other words, even when detecting "cone" in T5, T6, T7, and T8, the IP telephone apparatus does not switch the setting since value N in the management counter has yet to reach the predetermined number of times. When the IP telephone apparatus detects "cone" in a NAT type determination process (T9) in FIG. 19, the number of times to detect "cone" reaches the predetermined number of times of 5 (N=5). When the number of times reaches the predetermined number of 5 and when the time elapsed since the first detection of "cone" is 24 hours or more, the IP telephone apparatus determines that the NAT type is stabilized at "cone" and returns to the setting on the premise of restricted cone (RC mode).

In the present embodiment, the conditions for switching the setting are that the number of times to detect "cone" reaches the predetermined number of 5 and that the time elapses 24 hours or more from the first detection of "cone." However, the number of times and the duration may be set to desired values according to a variety of conditions.

Figure 20:
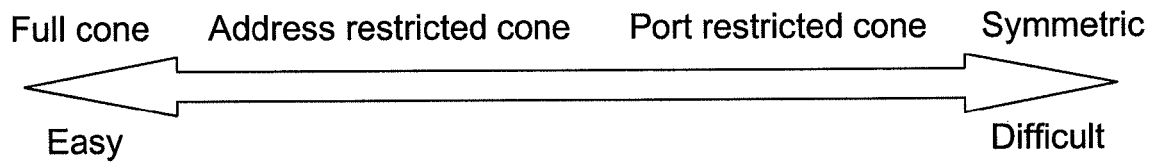
FIG. 20 illustrates easiness of P2P communication per NAT type.

FIG. 20 illustrates the NAT type and easiness of peer to peer (hereinafter referred to as P2P) communication. In view of easiness of connection, a connection is easiest in full cone among the plurality of NAT types, followed by restricted cone, port restricted cone, and then symmetric, in which connection is most difficult. In the embodiment above, the case is explained where the NAT type is switched between restricted cone and symmetric. Since the easiness of connection differs among cone types,-which include full cone, restricted cone, and port restricted cone, the present invention can be applied among the cone types.

Figure 16:
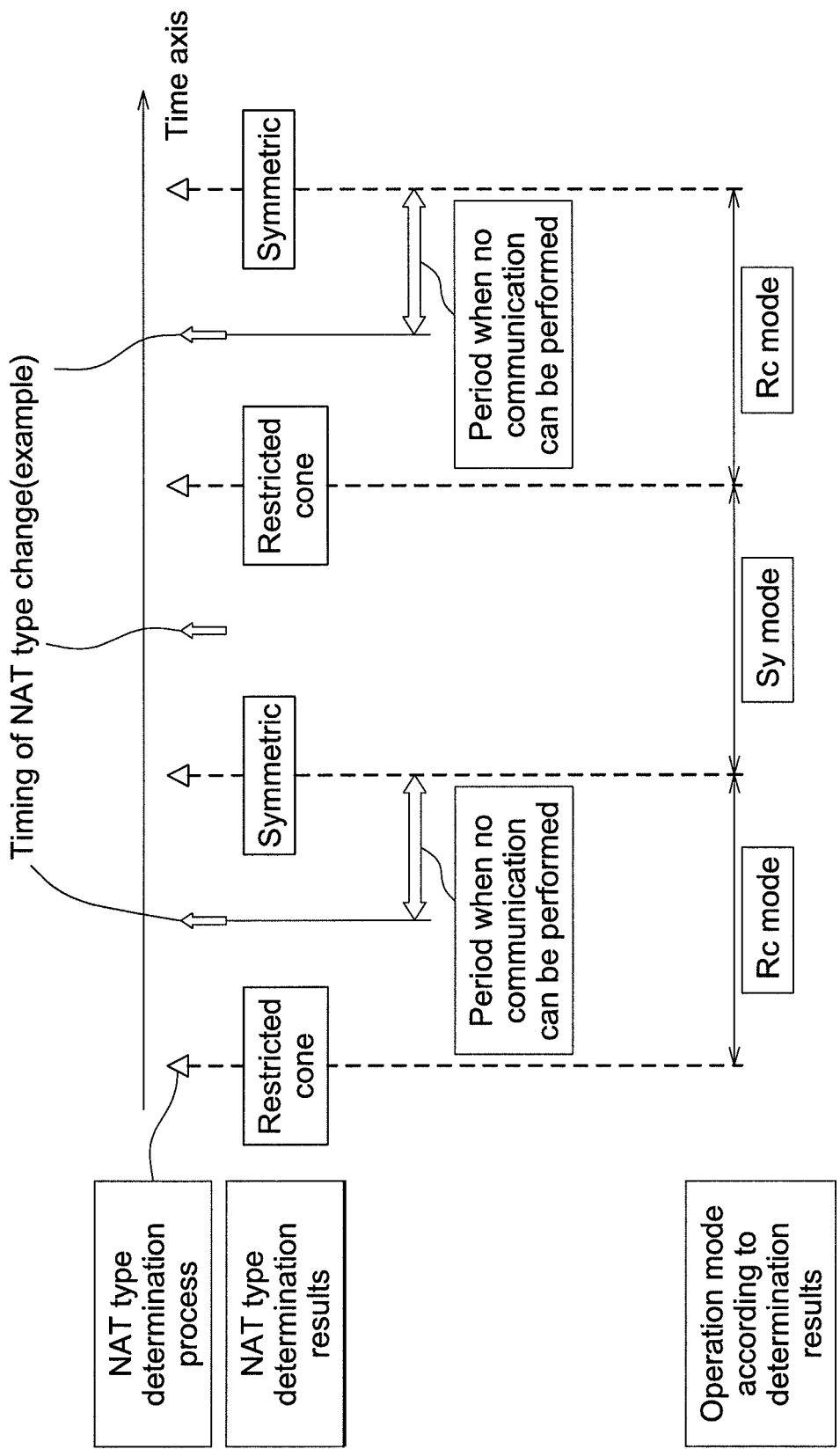
FIG. 16 is a sequence diagram illustrating conventional routine NAT type determination and change in terminal operation mode.

More specifically, when it is detected in a routine NAT type determination process that the NAT type is changed from an easy type (e.g., full cone type) to a difficult type (restricted cone type), the terminal setting is immediately changed. Particularly when the NAT type is changed from cone to symmetric, the operation setting of the IP telephone apparatus is changed at the point to communication via the server (FIG. 16: Sy mode). When the telephone apparatus is switched so as to communicate via the server, the NAT traversal information is stored in the relay server. As described earlier, however, when the connected router frequently changes the NAT type according to the PC operation status and the like, the NAT type might be switched back to cone in a short period of time.

In the present invention, even when detecting the change from a difficult type to an easy type, the apparatus does not immediately change the setting. The apparatus changes the setting only when detecting the type sequentially for a certain number of times or more. In other words, even when detecting the change to the easy type, the apparatus maintains the operation for difficult NAT traversal (Sy mode) until the status is stabilized.

In order to minimize cost of IP telephone connection, it is desirable to perform P2P communication between IP telephone apparatuses. As a result of routine NAT type determination, however, P2P communication becomes difficult after the NAT type changes from "cone" to "symmetric" as described above.

In addition, when it is detected that the NAT type is switched from previous "symmetric" to "cone," P2P communication becomes available. When the router frequently changes the NAT type as described above, however, the NAT type might return to "symmetric" after a short period of time. Due to unpredictability of the NAT type as described above, plus a time lag for storing the NAT traversal information in the server, merely performing routine NAT type determination is not sufficient.

The NAT type is not stabilized depending on a router of such a type, and thus a destination address and port number may not be accurately determined. Consequently, P2P communication cannot be performed.

In the present invention, setting priority of the NAT type and P2P communication easiness in advance enables P2P communication as much as possible.

When detecting that NAT is changed to a type in which P2P communication is difficult as a result of the NAT type determination process, the terminal immediately changes the NAT type for communication. When detecting that NAT is changed to a type in which P2P communication is easy as the determination process result, the terminal does not change the NAT type setting for communication to the detected NAT type, unless the NAT type continues for the predetermined duration and the predetermined number of times.

Even when the connected router frequently changes the NAT type, the configuration above allows the terminal apparatus to communicate via the server when being unable to perform P2P communication, without requiring a user to manually change the setting. The configuration then automatically switches the operation mode so as to provide P2P communication without the server after the status that enables P2P is stabilized. Thereby, the configuration ensures communication, secures the basic functions of the telephone apparatus, and further achieves inexpensive communication wherever possible, so as to meet users' expectations.

When the NAT type is determined pursuant to the standard technical specifications (RFC 3489), the IP communication apparatus according to the present invention and the NAT type determination method performed by the same prevent an erroneous NAT type determination while enhancing a range of determination targets (i.e., NAT properties) for a proper determination. Thus, the IP communication apparatus and NAT type determination method are effective as an IP communication apparatus connected to a wide area network via a relay apparatus having a NAT function and as a NAT type determination method performed by such an IP communication apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A NAT type determination method for determining a NAT type, comprising:
   a first transmission test, in which an IP communication apparatus that performs communication via a relay apparatus having a NAT function, transmits a first request to a first destination of a STUN server, the first destination including a first IP address and a first port number;
   a second transmission test, in which the IP communication apparatus transmits to the first destination, a second request that requests a change of a source IP address and a port number in a response;
   a third transmission test, in which the IP communication apparatus transmits a third request to a second destination of the STUN server, the second destination including a second IP address and a second port number;
   a fourth transmission test, in which the IP communication apparatus transmits to the first destination, a fourth request that requests a change of only a source port number in a response; and
   a fifth transmission test, in which the IP communication apparatus transmits a fifth request to a third destination, which includes at least one of a third IP address and a third port number different from the first and second destinations,
   wherein when finishing the first, second, third, fourth, and fifth transmission tests to the first, second, and third destinations at least one time each, the IP communication apparatus compares first source address information of one of the first, second, third, fourth, and fifth requests added in a first response from the STUN server in response to the one of the first, second, third, fourth, and fifth requests issued in a latest performed transmission test of the first, second, third, fourth, and fifth transmission tests, and second source address information of another of the first, second, third, fourth, and fifth requests added in a second response from the STUN server in response to the another of the first, second, third, fourth, and fifth requests issued in a preceding transmission test of the first, second, third, fourth, and fifth transmission tests, and
   when the first and second source address information are not identical, the IP communication apparatus determines that the NAT type is symmetric.

2. The NAT type determination method according to claim 1, wherein the first, second, third, and fourth transmission tests are sequentially executed, and the fifth transmission test is executed when there is no response from the STUN server after the fourth transmission test is executed.

3. The NAT type determination method according to claim 1, wherein the first, second, third, and fourth transmission tests are sequentially executed, and the fifth transmission test is executed immediately before one of the first, second, and third transmission tests.

4. The NAT type determination method according to claim 2, further comprising:
   a sixth transmission test, in which the IP communication apparatus transmits a request to a fourth destination, which includes at least one of a fourth IP address and a fourth port number different from the first, second, and third destinations, the sixth transmission test being executed after the fifth transmission test is executed.

5. An IP communication apparatus that has a NAT type determinator for determining a NAT type and that performs communication via a relay apparatus having a NAT function, the IP communication apparatus comprising:
   the NAT type determinator performs:
      a first transmission test, in which the NAT type determinator transmits a first request to a first destination of a STUN server, the first destination including a first IP address and a first port number;

a second transmission test, in which the NAT type determinator transmits to the first destination, a second request that specifies a change of a source IP address and a port number in a response;

a third transmission test, in which the NAT type determinator transmits a third request to a second destination of the STUN server, the second destination including a second IP address and a second port number;

a fourth transmission test, in which the NAT type determinator transmits to the first destination, a fourth request that specifies a change of only a source port number in a response; and a fifth transmission test, in which the NAT type determinator transmits a fifth request to a third destination, which includes at least one of a third IP address and a third port number different from the first and second destinations, wherein, when finishing the first, second, third, fourth, and fifth transmission tests to the first, second, and third destinations at least one time each, the NAT type determinator compares first source address information of one of the first, second, third, fourth, and fifth requests added in a first response from the STUN server in response to the one of the first, second, third, fourth, and fifth requests issued in a latest performed transmission test of the first, second, third, fourth, and fifth transmission tests, and second source address information of another of the first second, third, fourth, and fifth requests added in a second response from the STUN server in response to the another of the first, second, third, fourth, and fifth requests issued in a preceding transmission test of the first, second, third, fourth, and fifth transmission tests, and when the first and second source address information are not identical, the NAT type determinator determines that the NAT type is symmetric.

6. The NAT type determination method according to claim 1, wherein the IP communication apparatus routinely performs a NAT type determination process that includes the first, second, third, fourth, and fifth transmission tests, when a result of a preceding NAT type determination process indicates that the NAT type is one of a full cone, a restricted cone, and a port restricted cone, and a result of a current NAT type determination process indicates that the NAT type is symmetric, the IP communication apparatus immediately determines that the NAT type of the relay apparatus is symmetric, and when the result of the preceding NAT type determination process indicates that the NAT type is symmetric, and the result of the current NAT type determination process indicates that the NAT type is one of the full cone, the restricted cone, and the port restricted cone, the IP communication apparatus determines that the NAT type of the relay apparatus is the corresponding one of the full cone, the restricted cone, and the port restricted cone only when subsequent results of the NAT type determination process indicate that the NAT type is the corresponding one of the full cone, the restricted cone, and the port restricted cone sequentially for a predetermined number of times.

7. The IP communication apparatus according to claim 5, wherein the NAT type determinator routinely performs a NAT type determination process that includes the first, second, third, fourth, and fifth transmission tests, when a result of a preceding NAT type determination process indicates that the NAT type is one of a full cone, a restricted cone, and a port restricted cone, and a result of a current NAT type determination process indicates that the NAT type is symmetric, the NAT type determinator immediately determines that the NAT type of the relay apparatus is symmetric; and when the result of the preceding NAT type determination process indicates that the NAT type is symmetric, and the result of the current NAT type determination process indicates that the NAT type is one of the full cone, the restricted cone, and the port restricted cone, the NAT type determinator determines that the NAT type of the relay apparatus is the corresponding one of the full cone, the restricted cone, and the port restricted cone only when subsequent results of the determination process indicate the NAT type is the corresponding one of the full cone, the restricted cone, and the port restricted cone sequentially for a predetermined number of times.

8. The NAT type determination method according to claim 1, wherein:

the IP communication apparatus routinely performs a NAT type determination process that includes the first, second, third, fourth, and fifth transmission tests, when a result of a preceding NAT type determination process indicates that the NAT type is an easy type, and a result of a current NAT type determination process indicates that the NAT type is a difficult type, the IP communication apparatus immediately determines that the NAT type of the relay apparatus is the difficult type; and when the result of the preceding NAT type determination process indicates that the NAT type is the difficult type, and the result of the current NAT type determination process indicates that the NAT type is the easy type, the IP communication apparatus determines that the NAT type of the relay apparatus is the easy type only when subsequent results of the NAT type determination process indicate that the NAT type is the easy type sequentially for a predetermined number of times.

9. The IP communication apparatus according to claim 5, wherein the NAT type determinator routinely performs a NAT type determination process that includes the first, second, third, fourth, and fifth transmission tests, when a result of a preceding NAT type determination process indicates that the NAT type is an easy type, and a result of a current NAT type determination process indicates that the NAT type is a difficult type, the NAT type determinator immediately determines that the NAT type of the relay apparatus is the difficult type; and when the result of the preceding NAT type determination process indicates that the NAT type is the difficult type, and the result of the current NAT type determination process indicates that the NAT type is the easy type, the NAT type determinator determines that the NAT type of the relay apparatus is the easy type only when subsequent results of the determination process indicate the NAT type is the easy type sequentially for a predetermined number of times.

* * * * *